US012801586B2

(12) United States Patent
Goel et al.

(10) Patent No.: US 12,801,586 B2
(45) Date of Patent: Nov. 17, 2026

(54) DETERMINING FEATURE CONTRIBUTIONS TO DATA METRICS UTILIZING A CAUSAL DEPENDENCY MODEL

(71) Applicant: Adobe Inc., San Jose, CA (US)

(72) Inventors: Pulkit Goel, Faridabad (IN); Naman Poddar, Gorakhpur (IN); Gaurav Sinha, Bangalore (IN); Ayush Chauhan, Bengaluru (IN); Aurghya Maiti, Kolkata (IN)

(73) Assignee: Adobe Inc., San Jose, CA (US)

( * ) Notice: Subject to any disclaimer, the term of this patent is extended or adjusted under 35 U.S.C. 154(b) by 509 days.

(21) Appl. No.: 18/492,551

(22) Filed: Oct. 23, 2023

(65) Prior Publication Data

US 2024/0061830 A1 Feb. 22, 2024

Related U.S. Application Data

(63) Continuation of application No. 16/813,424, filed on Mar. 9, 2020, now Pat. No. 11,797,515.

(51) Int. Cl.
*G06F 16/23* (2019.01)

(52) U.S. Cl.
CPC ................................ *G06F 16/2365* (2019.01)

(58) Field of Classification Search
CPC ......................... G06F 16/2365; G06F 16/9024
USPC ............................................................ 706/52
See application file for complete search history.

(56) References Cited

U.S. PATENT DOCUMENTS

| | | | |
|---|---|---|---|
| 9,817,884 | B2 | 11/2017 | Greifeneder et al. |
| 10,242,101 | B2 | 3/2019 | Saini et al. |
| 10,404,777 | B2 | 9/2019 | Saini et al. |
| 11,336,506 | B1 | 5/2022 | Li et al. |
| 2009/0137882 | A1 | 5/2009 | Baudino et al. |
| 2015/0033086 | A1 | 1/2015 | Sasturkar et al. |
| 2017/0083929 | A1 | 3/2017 | Bates et al. |

(Continued)

OTHER PUBLICATIONS

Viswanathan et al. Ranking anomalies in data centers. 2012 IEEE Network Operations and Management Symposium. IEEE, 2012 (Year: 2012).*

(Continued)

*Primary Examiner* — Usman A Khan
(74) *Attorney, Agent, or Firm* — Keller Preece PLLC

(57) ABSTRACT

The present disclosure relates to methods, systems, and non-transitory computer-readable media for determining causal contributions of dimension values to anomalous data based on causal effects of such dimension values on the occurrence of other dimension values from interventions performed in a causal graph. For example, the disclosed systems can identify an anomalous dimension value that reflects a threshold change in value between an anomalous time period and a reference time period. The disclosed systems can determine causal effects by traversing a causal network representing dependencies between different dimensions associated with the dimension values. Based on the causal effects, the disclosed systems can determine causal contributions of particular dimension values on the anomalous dimension value. Further, the disclosed systems can generate a causal-contribution ranking of the particular dimension values based on the determined causal contributions.

20 Claims, 17 Drawing Sheets

(56) References Cited

U.S. PATENT DOCUMENTS

| | | | | |
|---|---|---|---|---|
| 2017/0108236 | A1 | 4/2017 | Guan et al. | |
| 2018/0060703 | A1 | 3/2018 | Fineis et al. | |
| 2020/0105417 | A1 | 4/2020 | Dolan | |
| 2021/0142190 | A1* | 5/2021 | Isahagian | G06N 5/04 |
| 2022/0136830 | A1 | 5/2022 | Dormody et al. | |
| 2025/0181713 | A1* | 6/2025 | Djeachandrane | G06F 21/554 |

OTHER PUBLICATIONS

[Beinlich et al. 1989] Beinlich, I. A.; Suermondt, H. J.; Chavez, R. M.; and Cooper, G. F. 1989. The alarm monitoring system: A case study with two probabilistic inference techniques for belief networks. In AIME 89. Springer. 247-256.

[Bishop 2006] Bishop, C. M. 2006. Pattern Recognition and Machine Learning (Information Science and Statistics). Berlin, Heidelberg: Springer-Verlag.

[Eaton and Murphy 2007] Eaton, D., and Murphy, K. P. 2007. Exact bayesian structure learning from uncertain interventions. In AISTATS.

[Eberhardt, Glymour, and Scheines 2005] Eberhardt, F.; Glymour, C.; and Scheines, R. 2005. On the number of experiments sufficient and in the worst case necessary to identify all causal relations among n variables. In Proceedings of the Twenty-First Conference on Uncertainty in Artificial Intelligence, UAI'05, 178-184. Arlington, Virginia, United States: AUAI Press.

[Hauser and Buhlmann 2012] Hauser, A., and Buhlmann, P. 2012. Characterization and greedy learning of interventional markov equivalence classes of directed acyclic graphs. J. Mach. Learn. Res. 13(1):2409-2464.

[Jones et al. 2001] Jones, E.; Oliphant, T.; Peterson, P.; et al. 2001—. SciPy: Open source scientific tools for Python. http: //www.scipy.org/.

[Korb et al. 2004] Korb, K. B.; Hope, L. R.; Nicholson, A. E.; and Axnick, K. 2004. Varieties of causal intervention. In Zhang, C.; W. Guesgen, H.; and Yeap, W.-K., eds., PRI-CAI 2004: Trends in Artificial Intelligence, 322-331. Berlin, Heidelberg: Springer Berlin Heidelberg.

[Nocedal and Wright 2006] Nocedal, J., and Wright, S. 2006. Numerical Optimization. Springer Series in Operations Research and Financial Engineering. Springer New York.

[Pearl 1998] Pearl, J. 1998. Graphical Models for Probabilistic and Causal Reasoning. Dordrecht: Springer Nether-lands. 367-389.

[Pearl 2009] Pearl, J. 2009. Causality: Models, Reasoning and Inference. New York, NY, USA: Cambridge University Press, 2nd edition.

[Scheines et al. 2019] Scheines, R.; Spirtes, P.; Glymour, C.; Meek, C.; and Richardson, T. 2019. The tetrad project. https://github.com/cmu-phil/tetrad.

[Thiesson et al. 1998] Thiesson, B.; Meek, C.; Chickering, D. M.; and Heckerman, D. 1998. Learning mixtures of dag models. In Proceedings of the Fourteenth Conference on Uncertainty in Artificial Intelligence, UAI'98, 504-513. San Francisco, CA, USA: Morgan Kaufmann Publishers Inc.

[Tian and Pearl 2001] Tian, J., and Pearl, J. 2001. Causal discovery from changes. In Proceedings of the Seventeenth Conference on Uncertainty in Artificial Intelligence, UAI'01, 512-521. San Francisco, CA, USA: Morgan Kaufmann Publishers Inc.

Adobe Analytics. Contribution analysis. https://www.adobe.com/in/analytics/ contribution-analysis.html. Date downloaded Mar. 25, 2020.

Amazon Kinesis Data Analytics. Random cut forest with explanation. https://docs.aws.amazon.com/kinesisanalytics/latest/sqlref/ sqlrf-random-cut-forest-with-explanation.html. Date downloaded Mar. 25, 2020.

Google Analytics. Explore change. https://support.google.com/analytics/answer/7550515?hl=en&ref_topic=7346206. Date downloaded Mar. 25, 2020.

Joseph Ramsey, Madelyn Glymour, Ruben Sanchez-Romero, and Clark Glymour. A million variables and more: the fast greedy equivalence search algorithm for learning high-dimensional graphical causal models, with an application to functional magnetic resonance images. International journal of data science and analytics, 3(2):121-129, 2017.

Mahimkar, Ajay Anil, et al. "Towards automated performance diagnosis in a large IPTV network." ACM SIGCOMM Computer Communication Review 39.4 (2009): 231-242.

Qiu, Huida, et al. "Granger causality for time-series anomaly detection." 2012 IEEE 12th international conference on data mining. IEEE, 2012.

Viswanathan et al. Ranking anomalies in data centers. 2012 IEEE Network Operations and Management Symposium. IEEE, 2012.

U.S. Appl. No. 16/813,424, filed Aug. 1, 2022, Office Action.

U.S. Appl. No. 16/813,424, filed Feb. 6, 2023, Office Action.

U.S. Appl. No. 16/813,424, filed Jun. 13, 2023, Notice of Allowance.

* cited by examiner

Determine A Conditional Probability Distribution For Each Node Of The Causal Network 306
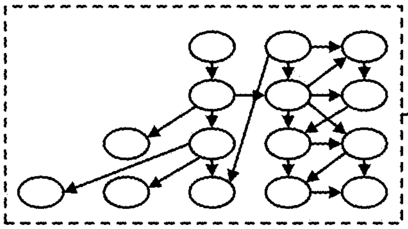
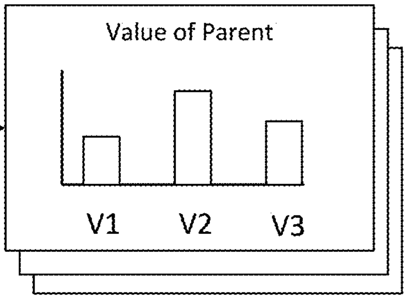
Determine A Marginal Probability For Each Dimension Value 308
Reference Dataset
| Marginal Probabilities | |
|---|---|
| United States | 0.4 |
| 416218 | 0.15 |
| 570004 | 0.13 |
| Mobile | 0.25 |
| 1.8.5 | 0.08 |
Fig. 3B Generate An Interventional Network For Each Dimension Value Represented In The Causal Network 318
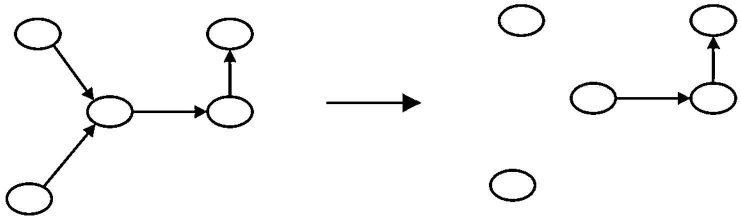
Determine Interventional Marginal Probabilities For The Dimension Values 320
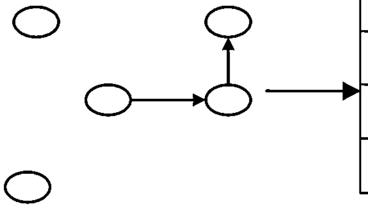
| Marginal Probabilities given country= India | |
|---|---|
| 416218 | 0.025 |
| 570004 | 0.098 |
| Mobile | 0.033 |
| 1.8.5 | 0.006 |
*Fig. 3D*

804

806

| | Contribution Analysis | | Causal Contribution Analysis | |
|---|---|---|---|---|
| Sl. No. | Dimension | Element | Dimension | Element |
| 1. | connection_type | LAN/Wifi | browser | Google Chrome 75 |
| 2. | va_closer_id | 12 | connection_type | LAN/Wifi |
| 3. | browser | Google Chrome 75 | country | India |
| 4. | geo_zip | 416218* | country | IP Address Only |
| 5. | post_pagename | Store: Mobiles&Accessories | va_closer_id | 12 |
| 6. | geo_zip | 570004* | post_Category | Mobile |
| 7. | geo_zip | 110001* | post_pagename | Mobile* |
| 8. | geo_zip | 411033 | geo_zip | 416218* |
| 9. | geo_zip | 600010* | os | Windows 7 |
| 10. | post_Category | Mobile | javascript | 1.8.5 |
| 11. | post_Category | CarAndBike* | country | U.S. Educational Institution |
| 12. | post_pagename | Mobile* | geo_zip | 600010* |
| 13. | geo_country | ind | country | Organization (mostly U.S.) |
| 14. | os | Windows 7 | geo_zip | 570004* |
| 15. | country | India | geo_zip | 110001* |

*Fig. 8*

| $N_{ivn}$ | MSE | MAPE | MABRE | $\Delta(\mathbf{\Pi}, \hat{\mathbf{\Pi}})$ |
|---|---|---|---|---|
| 0 | 5.32e-7 | 1.02e-4 | 6.92e-3 | 3.70e-4 |
| 5 | 3.65e-5 | 2.32e-3 | 3.09e-2 | 1.09e-2 |
| 9 | 5.26e-5 | 2.99e-3 | 3.40e-2 | 3.71e-2 |
| 17 | 3.78e-5 | 2.61e-3 | 2.58e-2 | 7.63e-3 |
| 34 | 5.19e-5 | 3.29e-3 | 3.46e-2 | 4.33e-2 |
| 68 | 4.22e-5 | 3.48e-3 | 3.46e-2 | 6.37e-2 |

*Fig. 9*

DETERMINING FEATURE CONTRIBUTIONS TO DATA METRICS UTILIZING A CAUSAL DEPENDENCY MODEL

CROSS-REFERENCE TO RELATED APPLICATIONS

The present application is a continuation of U.S. application Ser. No. 16/813,424, filed on Mar. 9, 2020. The aforementioned application is hereby incorporated by reference in its entirety.

BACKGROUND

In recent years, data analysis systems have improved software platforms for analyzing digital data and identifying relationships that explain changes in data over time. In particular, many systems can analyze digital data included within a dataset and generate digital reports that provide various insights into the digital data. These digital reports often provide details regarding particular dimensions and/or corresponding dimension values represented in the dataset. As an example, when a dataset includes an unexpected dimension value (e.g., a different representation than what has been seen in the past), many systems can generate a digital report that details the contributions of other dimension values to the anomalous representation. To illustrate, a dataset may reflect a significant increase in visitors accessing a webpage or a decrease in the number of users accessing a mobile application. Accordingly, a system may generate a digital report that shows how the other dimension values reflected in the dataset led to the increase of visitors or decrease in users.

Despite these advances, however, conventional data analysis systems suffer from several technological shortcomings that result in inflexible, inaccurate, and inefficient operation. For example, conventional data analysis systems are often inflexible in that they rigidly determine the contributions of particular dimension values to an anomaly in a dataset (e.g., an anomalous representation of a dimension value in the dataset) based on the face-value representation of those particular dimension values within the dataset. Accordingly, conventional systems may rigidly attribute at least a portion of an anomaly to a particular dimension value—whether or not that dimension value truly contributed to the anomaly—solely based on the dimension value's representation within the dataset.

In addition to flexibility concerns, conventional data analysis systems can also operate inaccurately. In particular, by rigidly determining the contributions of dimension values to an anomaly based on their face-value representations in a dataset, such systems may inaccurately determine the contribution of a particular dimension value to an anomaly. Accordingly, such systems can generate digital reports that provide an inaccurate analysis of the dataset and false insights resulting therefrom.

In addition to problems with inflexibility and inaccuracy, conventional data analysis systems are also inefficient. To illustrate, conventional systems often employ one of various models when determining the contributions of dimension values to an anomalous dimension value to converge to values that indicate those contributions. Due to inefficiencies in these models for this task, however, such conventional systems often require extensive computational time (e.g., in the order of several minutes to a few hours) and processing resources to converge to the values indicative of the contributions.

SUMMARY

This disclosure describes one or more embodiments of methods, non-transitory computer-readable media, and systems that solve one or more of the foregoing problems and provide other benefits. For example, in one or more embodiments, the disclosed systems determine causal contributions of dimension values to anomalous data based on causal effects of such dimension values on the occurrence of other dimension values from interventions performed in a causal graph. Such anomalous data may reflect a significant change in value from one time period to another time period as indicated by web-visitor metrics or other network user data. In some embodiments, the disclosed systems determine such causal effects by traversing a causal network representing dependencies between different dimensions associated with the dimension values. Based on the causal effects, the disclosed systems determine causal contributions of particular dimension values to an anomalous dimension value. The disclosed systems can further generate a ranking of the particular dimension values according to their causal contribution to the anomalous dimension value. Thus, the disclosed systems can accurately determine the contribution of a particular dimension value to an anomaly within a dataset based on flexible analysis of whether the occurrences of that dimension value within a dataset were caused by another dimension value.

BRIEF DESCRIPTION OF THE DRAWINGS

This disclosure will describe one or more embodiments of the invention with additional specificity and detail by referencing the accompanying figures. The following paragraphs briefly describe those figures, in which:

FIG. 3B illustrates an overview of the causal contribution system determining values of marginal probabilities from a causal network and a reference dataset in accordance with one or more embodiments;

FIG. 3D illustrates an overview of the causal contribution system determining interventional marginal probabilities for dimension values in accordance with one or more embodiments;

FIG. 8 illustrates a comparison between a contribution ranking list and a causal-contribution ranking list in accordance with one or more embodiments;

FIG. 9 illustrates a table reflecting experimental results regarding the effectiveness of the causal contribution system in accordance with one or more embodiments;

DETAILED DESCRIPTION

Figure 1:
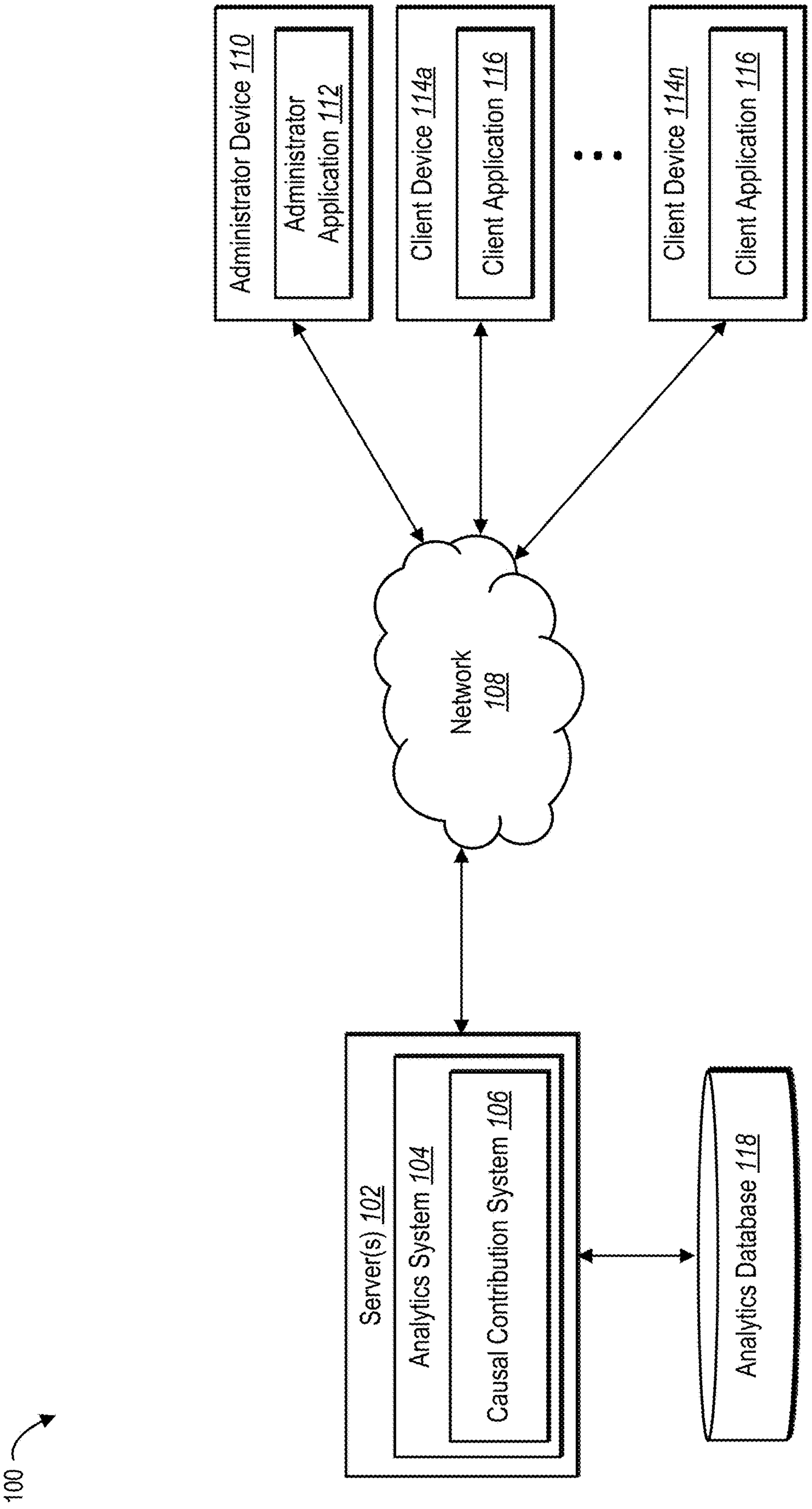
FIG. 1 illustrates an example system environment in which a causal contribution system can operate in accordance with one or more embodiments.

The disclosure describes one or more embodiments of a causal contribution system for determining causal contributions of dimension values to an anomalous dimension value based on causal effects of such dimension values on the occurrence of other dimension values from interventions performed in a causal graph. Such an anomalous dimension value may reflect a threshold change in value between a reference time period and an anomalous time period. In one or more embodiments, the causal contribution system determines causal effects based on simulated interventions in a causal network that was generated from a reference dataset and represents how dimensions corresponding to the dimension values depend on one another. In some implementations, the causal contribution system further determines the causal contributions by iteratively running a causal mixture model that models a dataset of the identified anomaly as a function of the causal contributions and the causal effects. In some instances, the causal contribution system generates a ranking of the dimension values according to their causal contributions to the anomaly and provides such a causal-contribution ranking of dimension values for display on a client device.

To provide an illustration, in one or more embodiments, the causal contribution system identifies, within an anomalous dataset for an anomalous time period, an anomalous dimension value reflecting a threshold change in value between the anomalous time period and a reference time period. The causal contribution system further determines causal effects of particular dimension values on corresponding dimension values from different dimensions within a reference dataset for the reference time period by traversing a causal network generated on the reference dataset. Based on the causal effects of the particular dimension values on the corresponding dimension values, the causal contribution system can determine causal contributions of the particular dimension values to the anomalous dimension value. The causal contribution system can further generate a causal-contribution ranking of the particular dimension values contributing to the anomalous dimension value based on the causal contributions of the particular dimension values.

As just mentioned, in one or more embodiments, the causal contribution system determines causal effects of particular dimension values on corresponding dimension values using a causal network. In particular, the causal network can include a structure of nodes corresponding to various dimensions associated with the dimension values represented in a reference dataset and directed edges that reflect dependencies across those dimensions. In one or more embodiments, the causal contribution system determines the causal effects by traversing the causal network (e.g., a previously generated causal network or causal network generated by the causal contribution system) and identifying the causal effects associated with the nodes of the dimensions associated with the particular dimension values.

In some embodiments, however, the causal contribution system generates the causal network based on a reference dataset and determines the causal effects based on the generated causal network. For example, in some instances, the causal contribution system further simulates interventions on nodes representing dimensions within the causal network to determine the causal effects of the particular dimension values. To illustrate, the causal contribution system can simulate interventions for a particular dimension value by removing, within the causal network, one or more edges between a node corresponding to a dimension of the particular dimension value and one or more nodes corresponding to one or more dimensions determined to be a causal parent of the dimension. The causal contribution system can further set the node corresponding to the dimension as equal to the dimension value. Based on a resulting interventional network, the causal contribution system can determine the causal effect of the particular dimension value on corresponding dimension values from different dimensions.

As further mentioned above, in one or more embodiments, the causal contribution system determines causal contributions of particular dimension values to an anomalous dimension value. Indeed, the causal contribution system can identify the anomalous dimension value from an anomalous dataset (e.g., a collection of data that includes the anomalous dimension value). The anomalous dimension value can include a dimension value that reflects a threshold change in value between the anomalous dataset and a reference dataset (e.g., the reference dataset used in generating the causal network).

In one or more embodiments, the causal contribution system determines the causal contributions of the particular dimension values to the anomalous dimension value based on the causal effects of those particular dimension values on corresponding dimension values from different dimensions. For instance, the causal contribution system can utilize a causal mixture model that models the anomalous dataset as a function of the causal effects of the dimension values and the causal contributions of those dimension values to the anomalous dimension value. Through the causal mixture model, the causal contribution system can determine the causal contributions. In some embodiments, the causal contribution system further utilizes an optimization model to minimize the error of the causal mixture model in determining the causal contributions of the dimension values.

As mentioned above, in some embodiments, the causal contribution system generates a causal-contribution ranking based on the determined causal contributions of the particular dimension values to the anomalous dimension value. In some instances, the causal contribution system further provides, for display on a client device, one or more dimension values as contributing to the anomalous dimension value. For example, in some embodiments, the causal contribution system identifies a subset of dimension values corresponding to the highest contributions to the anomalous dimension value based on the causal-contribution ranking. The causal contribution system can provide this subset of dimension values for display on the client device. In one or more embodiments, the causal contribution system provides dimension values as contributing to the anomalous dimension value within a ranked list.

The causal contribution system provides several advantages over conventional systems. For example, the causal contribution system can flexibly account for dependencies between dimension values within a dataset when determining contributions of those dimension values to an anomalous dimension value. Indeed, the causal contribution system can flexibly determine whether particular dimension values within a dataset are influenced by other dimension values within the dataset and, if so, a degree or strength of that influence. In other words, the causal contribution system can determine the causal effects of the other dimension values on the particular dimension values. The causal contribution system can further determine causal contributions of those particular dimension values to an anomalous dimension value based on the determined causal effects. Accordingly, the causal contribution system flexibly determines contributions based on data characteristics beyond the face-value representation of the particular dimension values within an anomalous dataset.

In addition to improved flexibility, the causal contribution system can more accurately determine a contribution of dimension values on an anomalous dimension value than conventional data analysis systems. By determining causal contributions of particular dimension values based on the causal effects of those dimension values, the causal contribution system can more accurately determine the overall contributions of dimension values to an anomalous dimension value. Indeed, by determining how a particular dimension value is influenced by other dimension values, the causal contribution system can avoid attributing credit to a particular dimension value when such attribution belongs to the other dimension values. As explained further below, in some cases, the causal contribution system utilizes an optimization model that reduces errors that may result when determining these causal contributions (e.g., via convergence of an objective function). Accordingly, the causal contribution system can determine a more accurate contribution of a dimension value to an anomalous dimension value and generate more accurate digital reports in comparison to many conventional systems, which fail to account for the dependencies among dimension values.

Independent of improved accuracy or flexibility, the causal contribution system can improve an efficiency with which a data analysis system determines a contribution of one dimension value on another dimension value. By utilizing an optimization model with a causal mixture model, in some embodiments, the causal contribution system determines the causal contributions of dimension values more efficiently than conventional systems. Indeed, the causal contribution system can converge on values indicative of the causal contributions within seconds—a significant improvement over the minutes or hours of computing often required by conventional systems. Accordingly, the causal contribution system can reduce the computational time and computer processing required to determine the causal contributions for dimension values. By expending merely seconds to converge on a causal contribution for an anomalous dimension value), the causal contribution system can determine such causal contributions of dimension values in near real-time.

As illustrated by the foregoing discussion, the present disclosure utilizes a variety of terms to describe features and benefits of the causal contribution system. As used herein, the term "event" refers to a quantifiable action performed by a user or a quantifiable result of an action by a user. An event, for instance, may be recorded by or trigger the recording of corresponding data. In particular, an event can refer to an action or occurrence (e.g., a result of an action) that triggers the generation, collection, or storage of digital data. For example, an event can include, but is not limited to, an application download, an application use, a click, a click-through, a conversion, an order, a purchase, a webpage view, a web search, an instance of a quantity of time spent on a given webpage, a first time visit, a visitor from a search engine or a social networking site, a transaction resulting in a quantity of revenue, or a quantity of revenue over a certain amount.

Additionally, as used herein, the term "dimension" refers to a set, category, or classification of values for organizing or attributing underlying digital data (e.g., dimension values). In some embodiments, a dimension refers to non-numeric characteristics (e.g., characteristics of a digital device or interactions or other actions of that digital device) that correlate, relate, or classify events. For example, a dimension can include, but is not limited to, language, device identifier, operating system, display resolution, browser, javascript, connection type, page name, country, city, or zip code. In some embodiments, a dimension more specifically refers to a metric. Indeed, a dimension can refer to a measurable (e.g., quantifiable) characteristic of data that can track how that characteristic is affected by one or more events. For example, a dimension can include page views, revenue, website visits, etc.

As used herein, the term "dimension value" refers to an element or particular data for a particular dimension. In particular, a dimension value can refer to a particular item, value, or component in a dimension. For example, a dimension value can include a particular language, device identifier, operating system, display resolution, browser, javascript used, connection type, page name, country, city, or zip code. In some embodiments, a dimension value more specifically refers to a metric value. For example, a dimension value can include a number of page views, an amount of revenue, a number of website visits, etc.

Relatedly, as used herein, the term "expected dimension value" refers to an expected representation of a particular dimension value within a dataset. For example, an expected dimension value can include an expected representation of a dimension value according to reference marginal probabilities (e.g., marginal probabilities determined based on a reference dataset) and the causal effects of particular dimension values on corresponding dimension values from different dimensions.

As used herein, the term "dataset" refers to a collection of digital data. In particular, a dataset can refer to a set of digital data representing a plurality of dimension values. For example, a dataset can include digital data representing various dimension values that correspond to different dimensions. In one or more embodiments, a dataset is associated with a time period that represents a frame of time within which the digital data was, generated, collected, or stored or a frame of time within which events associated with the digital data occurred.

As used herein, the term "anomalous dimension value" refers to a dimension value having an anomalous representation within a dataset. In particular, an anomalous dimension value can refer to a dimension value associated with a threshold change in value (e.g., a change in the representation of the dimension value that satisfies a threshold) when compared to a reference value (e.g., a dataset representation that is considered expected or typical). As suggested above, an anomalous dimension value can include an anomalous metric value, including, but not limited to, an anomalous number of page views, an anomalous amount of revenue, an anomalous number of website visits, etc. The term "anomalous dataset" refers to a dataset that includes an anomalous dimension value or an anomalous collection of digital data. In particular, an anomalous dataset can refer to a dataset that includes an anomalous dimension value. And the term "anomalous time period" refers to a time period associated with an anomalous dataset or a time period in which an anomalous dimension value occurred or was recorded.

As mentioned, in one or more embodiments, the representation of a dimension value can be anomalous based on a comparison with a reference representation of the dimension value in a dataset. As used herein, the term "reference dataset" refers to a dataset that includes a normal, non-anomalous, or typical collection of digital data. In particular, a reference dataset can refer to a dataset having a representation of dimension values determined to be expected or typical. The term "reference time period" can refer to a time period associated with a reference dataset or a time period in which normal or typical dimension values occurred or were recorded.

As used herein, the term "marginal probability" refers to a likelihood that a dimension value is associated with an event. In particular, a marginal probability can reflect a likelihood that a dimension value assessed at the occurrence of an event will equal a particular dimension value. In some embodiments, the causal contribution system determines a marginal probability of a dimension value based on an occurrence or a representation of the dimension value within a dataset (e.g., a reference dataset). Relatedly, as used herein, the term "anomalous marginal probability" refers to a marginal probability of a dimension value during an anomalous time period. For example, the causal contribution system can determine an anomalous marginal probability of a dimension value based on an anomalous dataset.

Additionally, as used herein, the term "causal network" refers to a graphical model representing dependencies among digital data. In particular, a causal network can refer to a graph structured with nodes and directed edges representing the dependencies between dimensions represented in a dataset. To illustrate, a causal network can include a directed acyclic graph, such as a causal Bayesian network or a family tree.

Further, as used herein, the term "causal parent" refers to digital data that influences or effects other digital data. In particular, a causal parent can refer to a dimension that effects another dimension within a dataset (e.g., effects the dimension value taken on by that dimension within the dataset). A causal parent for a particular dimension can be represented in a causal network as a node having a directed edge pointing toward the node representing that particular dimension.

As used herein, the term "intervention" refers to a process of modifying a causal network to simulate an effect of a particular dimension value on one or more other dimension values. In particular, an intervention can refer to a process of modifying a causal network to generate an interventional network that corresponds to a particular dimension value. For example, an intervention can include a process of modifying a causal network by removing directed edges coming into a node of the causal network that represents a dimension associated with the particular dimension value and setting the node as equal to the dimension value.

Additionally, as used herein, the term "causal effect" refers to the influence a dimension value has on one or more other dimension values. In particular, a causal effect refers to a metric that measures the effect of a dimension value on the occurrence of a corresponding dimension value from a different dimension. For example, a causal effect can indicate the likelihood that a dimension value from one dimension is associated with an event given that another dimension value from a second dimension is associated with the event. In one or more embodiments, the causal contribution system represents the causal effect of a dimension value on another dimension value as a probability. In particular, the causal contribution system can represent the causal effect of one dimension value on another dimension value as an interventional marginal probability resulting from an intervention on a causal network. Accordingly, an "interventional marginal probability" associated with a dimension value can refer to the causal effect of that dimension value on another dimension value (or the causal effect of the other dimension value on that dimension value).

Additionally, as used herein, the term "causal contribution" refers to the contribution of a particular dimension value to another dimension value. For instance, a causal contribution can represent a contribution of a particular dimension value in terms of causing an anomalous dimension value within an anomalous dataset or causing a threshold change in the representation. In particular, a causal contribution can refer to the contribution of a particular dimension value after accounting for the influence of one or more other dimension values within the anomalous dataset on a representation of the particular dimension value within the anomalous dataset. For example, the causal contribution for a particular dimension value can be based on the representation of the particular dimension value within the anomalous dataset minus any portion of the representation caused by one or more other dimension values within the anomalous dataset. As another example, the causal contribution of a particular dimension value can be based on a weighted representation of the particular dimension value within the anomalous dataset, where the weight applied is based on the influence of other dimension values within the anomalous dataset. In one or more embodiments, the causal contribution system represents the causal contribution of a dimension value as an interventional probability that an intervention associated with the dimension value occurred within the anomalous dataset. Accordingly, an "interventional probability" associated with a dimension value can refer to the causal contribution of the dimension value to an anomalous dimension value.

Further, as used herein, the term "causal-contribution ranking" refers to a ranking of dimension values based on corresponding causal contributions. For example, a causal-contribution ranking can include an ordered list or sequence that organizes the dimension values represented in an anomalous dataset based on their respective causal contributions to an anomalous dimension value from the anomalous dataset.

As used herein, the term "causal mixture model" refers to a computer representation or algorithm that models interventions on dimensions. In particular, a causal mixture model can refer to a computational or algorithmic representation of relationships between the causal effects of dimension values on corresponding dimension values from different dimensions and the causal contributions of those dimension values to an anomalous dimension value. More detail regarding the causal mixture model used by several embodiments of the causal contribution system will be provided below.

Additionally, as used herein, the term "optimization model" refers to a computer representation or model that adjusts a determination of causal contributions using an objective function. In particular, an optimization model can refer to one or more algorithms that reduce a difference or error in marginal probabilities as determined by an objective function. For example, an optimization model can include the objective function and one or more constraints applied to the objective function. More detail regarding the optimization model used by several embodiments of the causal contribution system will be provided below Additional detail regarding the causal contribution system will now be provided with reference to the figures. For example, FIG. 1 illustrates a schematic diagram of an exemplary system 100 in which a causal contribution system 106 can be implemented. As illustrated in FIG. 1, the system can include a server(s) 102, a network 108, an administrator device 110, client devices 114*a*-114*n*, and an analytics database 118.

Although the system 100 of FIG. 1 is depicted as having a particular number of components, the system 100 can have any number of additional or alternative components (e.g., any number of servers, administrator devices, client devices, analytics databases, or other components in communication with the causal contribution system 106 via the network 108). Similarly, although FIG. 1 illustrates a particular arrangement of the server(s) 102, the network 108, the administrator device 110, the client devices 114*a*-114*n*, and the analytics database 118, various additional arrangements are possible.

The server(s) 102, the network 108, the administrator device 110, the client devices 114*a*-114*n*, and the analytics database 118 may be communicatively coupled with each other either directly or indirectly (e.g., through the network 108 discussed in greater detail below in relation to FIG. 14). Moreover, the server(s) 102, the administrator device 110, and the client devices 114*a*-114*n* may include a variety of computing devices (including one or more computing devices as discussed in greater detail with relation to FIG. 14).

As mentioned above, the system 100 includes the server(s) 102. The server(s) 102 can generate, store, receive, and/or transmit data, including dimension values related to events. For example, the server(s) 102 can detect an event caused by a client device (e.g., one of the client devices 114*a*-114*n*) and generate, receive, and/or store corresponding dimension values. In some embodiments, the server(s) 102 can transmit digital reports regarding stored dimension values to the administrator device 110. In one or more embodiments, the server(s) 102 comprises a data server. The server(s) 102 can also comprise a communication server or a web-hosting server.

As shown in FIG. 1, the server(s) 102 can include an analytics system 104. In particular, the analytics system 104 can collect, manage, and utilize analytics data. For example, the analytics system 104 can collect analytics data (e.g., dimension values) related to events. The analytics system 104 can collect the analytics data in a variety of ways. For example, in one or more embodiments, the analytics system 104 causes the server(s) 102 to track digital data related to events and report the tracked data for storage on a database (e.g., the analytics database 118). In one or more embodiments, the analytics system 104 receives the data directly from the client devices 114*a*-114*n* via data stored thereon.

Additionally, the server(s) 102 include the causal contribution system 106. In particular, in one or more embodiments, the causal contribution system 106 utilizes the server(s) 102 to determine the causal contributions of particular dimension values to an anomalous dimension value. For example, the causal contribution system 106 can utilize the server(s) 102 to identify an anomalous dimension value and determine the causal contributions from one or more other dimension values accordingly.

For example, in one or more embodiments, the causal contribution system 106, via the server(s) 102, identifies an anomalous dimension value within an anomalous dataset. The causal contribution system 106 can, via the server(s) 102, determine causal effects of particular dimension values on corresponding dimension values from different dimensions within a reference dataset by traversing a causal network generated on the reference dataset. Via the server(s) 102, the causal contribution system 106 can determine causal contributions of the particular dimension values to the anomalous dimension value based on the determined causal effects. The causal contribution system 106 can further, via the server(s) 102, generate a causal-contribution ranking of the particular dimension values contributing to the anomalous dimension value based on the determined causal contributions.

In one or more embodiments, the analytics database 118 stores digital data related to events. For example, the analytics database 118 can store dimension values associated with events. Though FIG. 1 illustrates the analytics database 118 as a distinct component, one or more embodiments include the analytics database 118 as a component of the server(s) 102, the analytics system 104, or the causal contribution system 106.

In one or more embodiments, the administrator device 110 includes a computing device that can receive and display digital data related to events stored dimension values (e.g., dimension values stored in the analytics database 118). For example, the administrator device 110 can include a smartphone, a tablet, a desktop computer, a laptop computer, or another electronic device. The administrator device 110 can include one or more applications (e.g., the administrator application 112) that can receive and display digital data related to events stored dimension values. For example, the administrator application 112 can include a software application installed on the administrator device 110. Additionally, or alternatively, the administrator application 112 can include a software application hosted on the server(s) 102, which may be accessed by the administrator device 110 through another application, such as a web browser.

In one or more embodiments, the client devices 114*a*-114*n* include computing devices that can cause events that trigger the generation, collection, and/or storage of digital data, such as dimension values. For example, the client devices 114*a*-114*n* can include smartphones, tablets, desktop computers, laptop computers, head-mounted-display devices, or other electronic devices. The client devices 114*a*-114*n* can include one or more applications (e.g., the client application 116) that can cause events that trigger the generation, collection, and/or storage of digital data, such as dimension values. For example, the client application 116 can include a software application installed on the client devices 114*a*-114*n*. Additionally, or alternatively, the client application 116 can include a software application hosted on the server(s) 102, which may be accessed by the client devices 114*a*-114*n* through another application, such as a web browser.

The causal contribution system 106 can be implemented in whole, or in part, by the individual elements of the system 100. Indeed, although FIG. 1 illustrates the causal contribution system 106 implemented with regard to the server(s) 102, different components of the causal contribution system 106 can be implemented in a variety of components of the system 100. For example, one or more components of the causal contribution system 106—including all components of the causal contribution system 106—can be implemented by a computing device (e.g., one of the client devices 114*a*-114*n*) or a separate server from the server(s) 102 hosting the analytics system 104. Example components of the causal contribution system 106 will be described below with regard to FIG. 12.

Figure 2:
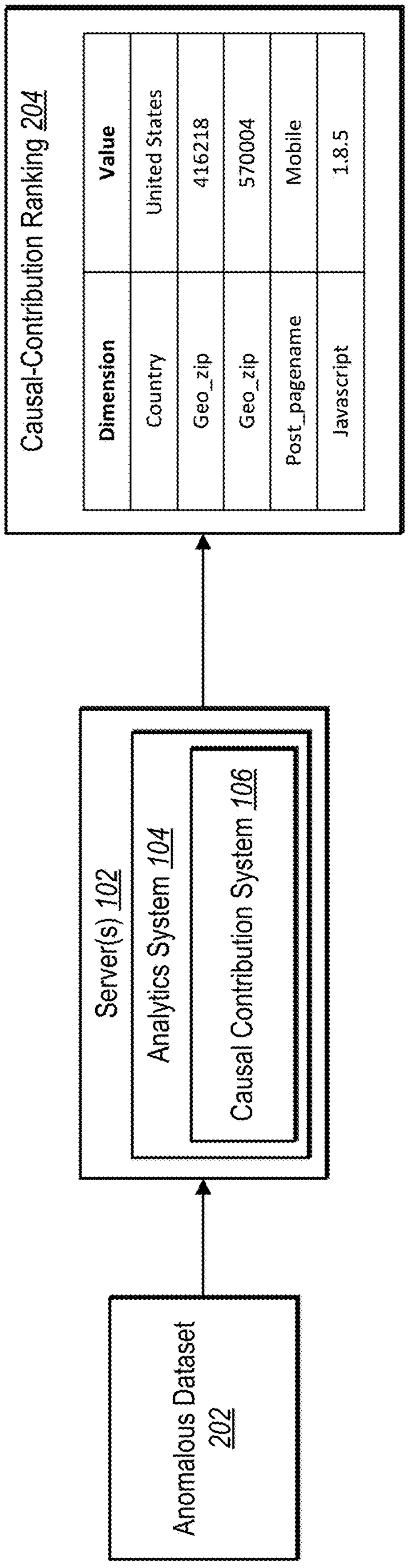
FIG. 2 illustrates an overview diagram of the causal contribution system generating a causal-contribution ranking in accordance with one or more embodiments.

As mentioned above, the causal contribution system 106 can generate a causal-contribution ranking based on causal contributions of particular dimension values to an anomalous dimension value. FIG. 2 illustrates a block diagram of the causal contribution system 106 generating a causal-contribution ranking in accordance with one or more embodiments.

As shown in FIG. 2, the causal contribution system 106 identifies an anomalous dataset 202. In one or more embodiments, the causal contribution system 106 identifies the anomalous dataset 202 by receiving the anomalous dataset 202 from a computing device (e.g., a third-party server). In some embodiments, however, the causal contribution system 106 identifies the anomalous dataset 202 by accessing a database storing digital data. For example, the causal contribution system 106 receives digital data from one or more client devices and stores the digital data within a database. The causal contribution system 106 can access the database and retrieve the anomalous dataset 202. In some embodiments, an external device or system stores the digital data corresponding to the anomalous dataset 202 within a database for access by the causal contribution system 106.

In one or more embodiments, the causal contribution system 106 identifies the anomalous dataset 202 based on a time period (e.g., an anomalous time period) defined by a user (e.g., an administrator of the causal contribution system) or identified by the causal contribution system 106. For example, the causal contribution system 106 can receive, from a client device (e.g., an administrator device), a user selection of an anomalous time period. The causal contribution system 106 can retrieve the digital data that corresponds to the anomalous time period, the digital data making up the anomalous dataset. As another example, the causal contribution system 106 can identify an anomalous time period based on periodically surveying digital data stored in a database (e.g., surveying new digital data stored within the database every few weeks, every month).

In some embodiments, the anomalous dataset 202 includes dimension values across a plurality of dimensions (e.g., the digital data of the anomalous dataset 202 corresponds to the dimension values). In particular, the anomalous dataset 202 can include an anomalous dimension value (e.g., at least one of the dimension values represented in the anomalous dataset 202 is an anomalous dimension value). In some embodiments, the causal contribution system 106 identifies the anomalous dimension value within the anomalous dataset 202.

As further shown in FIG. 2, the causal contribution system 106 generates a causal-contribution ranking 204. In particular, the causal contribution system 106 can determine causal contributions of particular dimension values represented in the anomalous dataset 202 to the anomalous dimension value. The causal contribution system 106 can generate the causal-contribution ranking 204 based on the determined causal contributions. In some embodiments, the causal contribution system 106 provides, for display on a graphical user interface of a client device, one or more dimension values as contributing to the anomalous dimension value based on the causal-contribution ranking (e.g., within a ranked list).

In one or more embodiments, the causal contribution system 106 determines the causal contributions of the dimension values to the anomalous dimension value based on the causal effects of the dimension values on corresponding dimension values from different dimensions. In some embodiments, the causal contribution system 106 determines the causal effects of the dimension values based on a reference dataset as will be described below with reference to FIGS. 3A-3D. In some instances, the causal contribution system 106 generally defines the causal contribution of a dimension value to an anomalous dimension value as follows:

$$\pi_{i,\alpha} = \frac{o_{i,\alpha} - E_{i,\alpha} - W_{i,\alpha}}{N} \tag{1}$$

In function 1, $\pi_{i,\alpha}$ refers to the causal contribution corresponding to dimension value $\alpha$ of dimension i, $O_{i,\alpha}$ represents the observed number of occurrences of dimension value $\alpha$ within the anomalous dataset 202, $E_{i,\alpha}$ represents the expected number of occurrences of the dimension value $\alpha$ within the anomalous dataset 202, $W_{i,a}$ represents the number of occurrences of the dimension value $\alpha$ within the anomalous dataset 202 caused by occurrences of other dimension values within the anomalous dataset 202, and N represents the total number of events represented within the anomalous dataset 202.

In some embodiments, where the anomalous dimension value represents a positive change in value, the causal contribution system 106 constrains the causal contributions of the dimension values to the anomalous dimension value to be non-negative. In other words, the causal contribution system 106 can determine that dimension values only contribute positively to the anomalous dimension value. Similarly, in some embodiments, where the anomalous dimension value represents a negative change in value, the causal contribution system 106 constrains the causal contributions of the dimension values to the anomalous dimension value to be negative. But the causal contribution system 106 is not limited to such constraints.

As mentioned above, the causal contribution system 106 can determine the causal contributions of particular dimension values to an anomalous dimension value based on the causal effects of the dimension values on corresponding dimension values from different dimensions. As further mentioned, the causal contribution system 106 can determine the causal effects of the dimension values based on a reference dataset. In some embodiments, the causal contribution system 106 determines additional values used in determining the causal contributions of the dimension values based on the reference dataset. FIGS. 3A-3D illustrate diagrams of the causal contribution system 106 determining various values based on a reference dataset in accordance with one or more embodiments. In one or more embodiments, the causal contribution system 106 determines the various values discussed with reference to FIGS. 3A-3D in an offline mode. In other words, the causal contribution system 106 can determine these values well before the need to determine causal contributions to an anomalous dimension value arises.

Figure 3A:
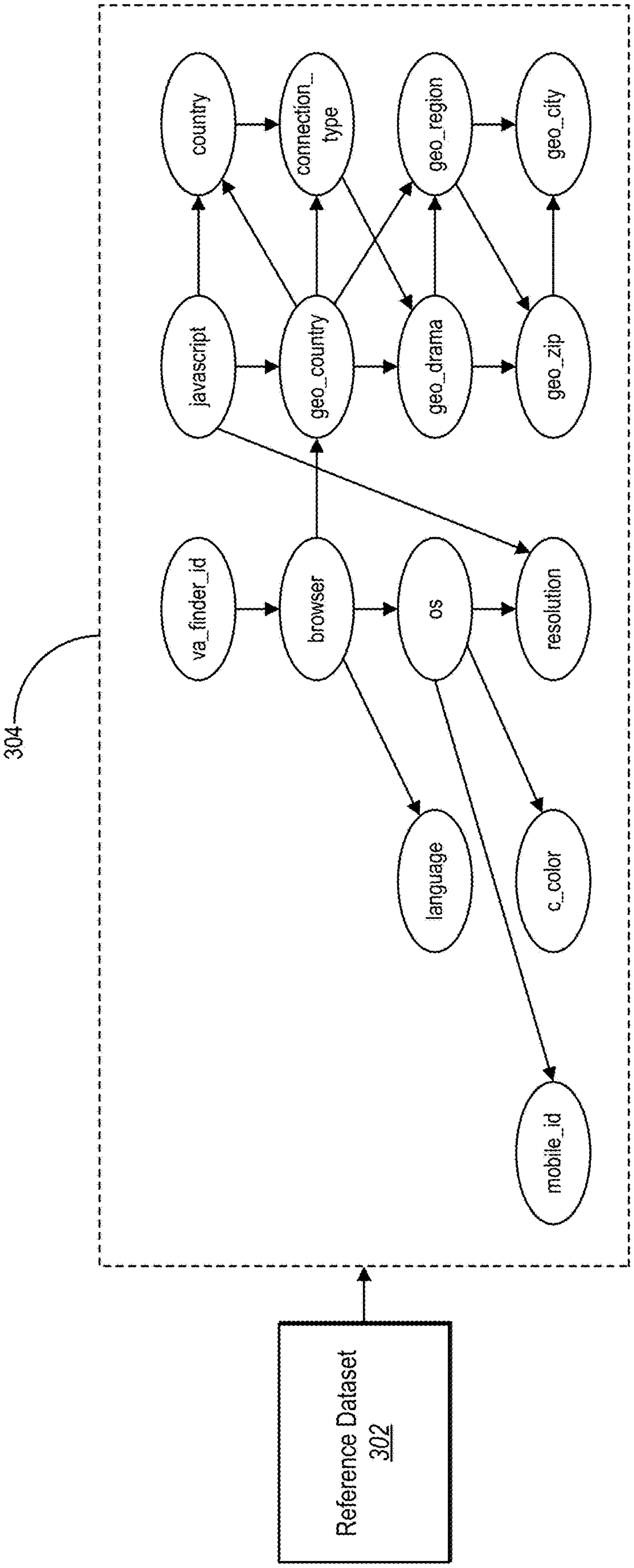
FIG. 3A illustrates a block diagram of the causal contribution system generating an illustrative causal network in accordance with one or more embodiments.

FIG. 3A illustrates a diagram of the causal contribution system 106 generating a causal network 304 based on a reference dataset 302 in accordance with one or more embodiments. In particular, the reference dataset 302 includes dimension values across a plurality of dimensions (e.g., the same dimension values that are included in the anomalous dataset). As with the anomalous dataset, the causal contribution system 106 can identify the reference dataset 302 in various manners (e.g., receiving the reference dataset 302 from a computing device, accessing a database storing digital data). Further, in one or more embodiments, the causal contribution system 106 identifies the reference dataset 302 based on a reference time period. In some instances, the causal contribution system 106 determines the reference time period based on user selection (e.g., a selection by an administrator). However, the causal contribution system 106 can determine the reference time period without user input in some embodiments.

In one or more embodiments, the causal contribution system 106 pre-processes the reference dataset 302 before generating the causal network 304. Indeed, the causal contribution system 106 can refine the data of the reference dataset 302 to reduce the size as well as the noise associated with the reference dataset 302. For example, the causal contribution system 106 can represent the reference dataset 302 as an organized table where each row corresponds to an event, each column corresponds to a dimension, and the values in the table represent the dimension values of the dimension for the corresponding event. Accordingly, the causal contribution system 106 can filter out sparsely populated columns (e.g., remove the corresponding dimensions from the reference dataset 302). In some embodiments, the causal contribution system 106 filters out columns that contribute less than a predetermined amount (e.g., less than one percent) to the reference dataset 302. In some instances—such as where a column includes many distinct dimension values—the causal contribution system 106 can combine the dimension values for that column to satisfy the predetermined amount and avoid removal.

In one or more embodiments, the causal contribution system 106 further pre-processes the reference dataset 302 by capturing a sample of the reference dataset 302 (e.g., to reduce the size of the data). For example, the causal contribution system 106 can randomly sample the rows of the reference dataset 302. Additionally, the causal contribution system 106 can fill in missing values in the sampled data. For example, a dimension value may be missing where the corresponding dimension did not apply to the event or, for numerical dimensions, the dimension value was zero. Accordingly, the causal contribution system 106 can fill in missing dimension values by adding in the appropriate value (e.g., a default value or a value indicating the dimension value did not apply).

As shown in FIG. 3A, the causal contribution system 106 generates the causal network 304 based on the reference dataset 302 (e.g., based on the pre-processed reference dataset). In one or more embodiments, the causal contribution system 106 utilizes a fast greedy equivalence search algorithm to generate the causal network 304. For example, in one or more embodiments, the causal contribution system 106 incorporates the fast greedy equivalence search algorithm as described by Joseph Ramsey et al., *A Million Variables and More: The Fast Greedy Equivalence Search Algorithm For Learning High-dimensional Graphical Causal Models, With an Application to Functional Magnetic Resonance Images*, International Journal of Data Science and Analytics, 3(2):121-129 (2017), which is incorporated herein by reference in its entirety. In some embodiments, the causal contribution system 106 utilizes another algorithm to generate the causal network 304, such as another variation of a greedy search algorithm.

As discussed above, in one or more embodiments, the causal network 304 includes a Bayesian causal network. Indeed, in some embodiments, the causal network 304 includes a network described by Judea Pearl and Stuart Russel, *Bayesian Networks*, UCLA Department of Statistics Papers, https://escholarship.org/uc/item/53n4f34m (2000), which is incorporated by reference herein in its entirety.

As further shown in FIG. 3A, the structure of the causal network 304 includes a plurality of nodes and a plurality of edges. In particular, each node from the plurality of nodes corresponds to a different dimension represented in the reference dataset 302 (e.g., a "browser" dimension, a "resolution" dimension, a "country" dimension). Further, the edges of the causal network 304 include directed edges, where a given edge originates from a particular node and terminates at another node. In some instances, a node upon which a directed edge terminates can be dependent upon the node (referred to as the "causal parent") from which that directed edge originates. In other words, for a causal network with nodes $X_1, \ldots, X_n$, an edge from $X_i$ to $X_j$ implies that $X_i$ "causes" $X_j$ directly or changing the value of $X_i$ by intervention will lead to a change in the value of $X_j$. In some instances, nodes that are not connected directly can still have a causal relationship based on the bath of edges between them. Thus, the causal network 304 illustrates the dependencies between the dimensions corresponding to the nodes. It should be noted that the causal network 304 of FIG. 3A is merely an exemplary illustration of possible dependencies between dimensions. In some embodiments, a causal graph will show different dependencies among dimensions based on an analysis of the corresponding reference dataset. Further, in some embodiments, a causal graph will include more, fewer, or alternative dimensions entirely based on the data represented in the corresponding reference dataset.

To provide additional detail, in one or more embodiments, the causal network 304 gives a compact representation of joint distributions. In particular, the causal network 304 includes two components (S, θ), where S represents the structure of the causal network 304 having nodes being random variables and θ represents certain conditional probability distributions at the nodes of S. By utilizing the causal network 304 to represent a joint variable, the causal contribution system 106 can incorporate factorization of the joint variable into conditionals. For example, the causal contribution system 106 can utilize a causal network with nodes $X_1, \ldots, X_n$ to represent a factorization of the joint variable $(X_1, \ldots, X_n)$ using the following:

$$P(X_1, \ldots, X_n) = \prod_{i \in [n]} P(X_i | Pa(X_i)) \tag{2}$$

In function 2, $Pa(X_i)$ denotes the parents of $X_i$. In one or more embodiments, the causal contribution system 106 utilizes S to determine how to factorize and θ corresponds to the set of conditional distributions $\{P(X_i|Pa(X_i)):i\in[n]\}$. In some embodiments, based on function 2, the causal contribution system 106 defines a generative model where the joint distribution is generated from the causal network 304. In one or more embodiments, the causal contribution system 106 utilizes the causal network 304 to perform inference (e.g., determine P(A|B) where A, $B \subset \{X_1, \ldots, X_n\}$, $A \cap B = \phi$).

FIG. 3B illustrates an overview of a sequence of steps that the causal contribution system 106 performs for determining various values from the reference dataset and/or the causal network in accordance with one or more embodiments. Though FIG. 3B illustrates the causal contribution system 106 performing the steps in a particular sequence, the causal contribution system 106 can perform the steps in different sequence orders as well.

For instance, as shown in FIG. 3B, the causal contribution system 106 performs an act 306 of determining a conditional probability distribution (CPD) for each node of the causal network 304. In particular, the CPD at each node represents the probability distribution of the corresponding dimension represented in the reference dataset 302 given the value of its causal parent(s) in the causal network 304. In one or more embodiments, the CPDs reflect a strength of the directed edges within the causal network 304.

In one or more embodiments, the causal contribution system 106 determines the CPDs by traversing through the causal network 304 in topological order. At each node, the causal contribution system 106 can set the causal parent(s) to a particular dimension value. The causal contribution system 106 can calculate the probability of each dimension value for the node that corresponds to the causal parent(s) equaling the particular dimension value.

Though FIG. 3B shows the causal contribution system 106 determining the CPDs based on the causal network 304, the causal contribution system 106 can determine the CPDs based on the reference dataset 302 in some embodiments. Indeed, the causal contribution system 106 can set the causal parent(s) to a particular dimension value by selecting the rows of the reference dataset 302 where the causal parent(s) equal that dimension value. The causal contribution system 106 can further calculate the probability of each dimension value for the particular dimension (e.g., the dimension corresponding to the node within the causal network 304) by determining the representation of the dimension value within the selected rows (e.g., determining the probability of the dimension value in those rows).

As shown in FIG. 3B, the causal contribution system 106 further performs an act 308 of determining a marginal probability for each dimension value represented in the reference dataset 302. In one or more embodiments, the causal contribution system 106 determines the marginal probability for a dimension value by identifying a number of occurrences of the dimension value within the reference dataset 302. The causal contribution system 106 can further compare the number of occurrences of the dimension value to a number of events represented within the reference dataset 302. For example, in some embodiments, the causal contribution system 106 compares the number of occurrences to the number of events by determining what fraction of the events represented within the reference dataset 302 are associated with the dimension value (e.g., by dividing the number of occurrences of the dimension value by the number of events). For purposes of notation, the causal contribution system 106 can represent the marginal probability of dimension value $\alpha$ of dimension i as $p_{i,\alpha}$.

Though FIG. 3B illustrates the causal contribution system 106 determining the marginal probabilities for the dimension values based on the reference dataset 302, the causal contribution system 106 can determine the marginal probabilities based on the causal network 304 in some embodiments. Indeed, in some instances, the causal network 304 includes the same digital data represented in the reference dataset 302.

Figure 3C:
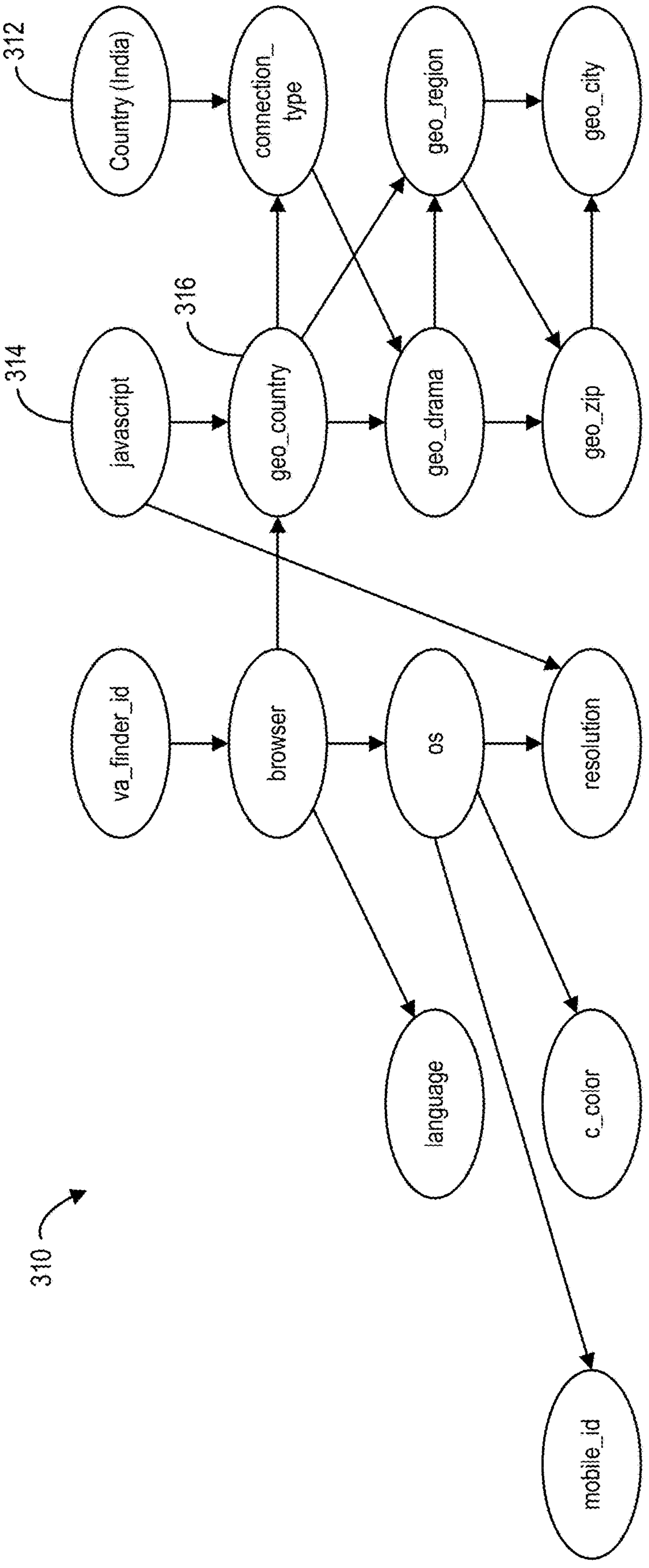
FIG. 3C illustrates a diagram of the causal contribution system generating a causal network in accordance with one or more embodiments.

In one or more embodiments, the causal contribution system 106 utilizes the causal network 304 to determine the degree to which one dimension represented in the reference dataset 302 effects another dimension within the reference dataset. In other words, the causal contribution system 106 determines the causal effect of one dimension value on a corresponding dimension value from a different dimension. In some embodiments, the causal contribution system 106 utilizes an inference algorithm (e.g., a causal inference algorithm) to determine the causal effects of the dimension values on the corresponding dimension values from the different dimensions. Indeed, in some embodiments, the causal contribution system 106 implements the inference algorithm by determining interventional marginal probabilities of the dimension values based on interventional networks generated from the causal network 304. FIG. 3C illustrates the causal contribution system 106 generating an interventional network for a dimension value based on the causal network 304 in accordance with one or more embodiments.

In particular, FIG. 3C illustrates the causal contribution system 106 generating the interventional network 310 for the dimension value "India" of the dimension "country" corresponding to the node 312. As shown in FIG. 3C, the causal contribution system 106 can generate the interventional network 310 by removing edges between the node 312 and the nodes corresponding to the causal parents of the node 312 (i.e., the nodes corresponding to the causal parents being the node 314 and the node 316 as shown within the causal network 304 of FIG. 3A). In one or more embodiments, the causal contribution system 106 removes the edges using a graph surgery technique. By removing the edges from the causal parents, the causal contribution system 106 can establish the dimension "country" as causally independent within the interventional network 310.

Further, as shown in FIG. 3C, the causal contribution system 106 sets the node 312 equal to the dimension value "India." Accordingly, the causal contribution system 106 can explicitly force the dimension value "India" to act as the cause in the interventional network 310 and eliminate other mechanisms by which the dimension "country" can take the dimension value "India" (by eliminating the dependencies upon the causal parents). Thus, the causal contribution system 106 can establish the dimension value "India" as the root cause in the interventional network 310. In one or more embodiments, generating the interventional network 310 further modifies the CPDs determined from the causal network 304.

FIG. 3D illustrates an overview of a sequence of acts that the causal contribution system 106 performs for determining the causal effects of dimension values on corresponding dimension values from different dimensions based on interventional networks generated for the dimension values. Though FIG. 3D illustrates the causal contribution system 106 performing the steps in a particular sequence, the causal contribution system 106 can perform the steps in different sequence orders as well.

For instance, as shown in FIG. 3D, the causal contribution system 106 performs an act 318 of generating an interventional network for each dimension value represented in the causal network 304. In particular, the causal contribution system 106 can generate an interventional network for each dimension value as discussed above with reference to FIG. 3C.

Furthermore, as illustrated in FIG. 3D, the causal contribution system 106 performs an act 320 of determining interventional marginal probabilities for the dimension values. In particular, the causal contribution system 106 determines the interventional marginal probabilities based on the interventional networks (e.g., based on the modified CPDs associated with the interventional networks). As an example, the causal contribution system 106 can determine the interventional marginal probabilities as follows:

$$P(X_j=\beta|do(X_i=\alpha))\forall(j,\beta) \quad (3)$$

Function 3 represents the probabilities that the dimension j will equal each dimension value associated with dimension j (e.g., each of βof j) given that dimension i has taken on dimension value α. In one or more embodiments, the causal contribution system 106 determines the interventional marginal probabilities based on the interventional networks using an inference algorithm. In one or more embodiments, because the dimension value α of the dimension i acts as the cause in the corresponding interventional network, the resulting interventional marginals are the causal effects of the pair (i, α) on (j, β) for all (j, β). For purposes of notation, the causal contribution system 106 can represent the causal effect of (i, α) on a particular pair (j, β) as $\Delta_{i,\alpha}$(j, β). In some embodiments, the causal contribution system 106 determines the interventional marginal probabilities in a similar manner as discussed above with regard to the marginal probabilities of the dimension values (e.g., comparing a number of occurrences of the dimension values with a number of events) but based on the interventional networks.

To provide additional detail regarding performing interventions and determining interventional marginal probabilities, given two random variables X, Y, the causal contribution system 106 can perform a causal inference task by computing interventional marginal probabilities of the form:

$$P(Y|do(X=x)) \quad (4)$$

Function 4 represents the probability distribution of Y given that the variables X has been intervened and set to x. Using these interventional marginal probabilities, the causal contribution system 106 can determine the causal effect of changing the value of X from $x_1$ to $x_2$ on the distribution of Y using the following function:

$$\mathbb{D}(P(Y=y|do(X=x_2)),P(Y=y|do(X=x_1))) \quad (5)$$

In function 5, D represents a measure of distance between two categorical probability distributions. In some embodiments, the causal contribution system 106 determines an aggregated measure called the aggregated causal effect, defined as:

$$\mathbb{E}[Y|do(X=x_2)]-\mathbb{E}[Y|do(X=x_1)] \quad (6)$$

Generally speaking, causal inference on observational data is difficult since confounders affecting both X and Y might not be known, which leads to difficulty in performing interventions. However, by capturing X, Y, and all the confounders in a causal network, the causal contribution system 106 can perform the interventions with less difficulty. For example, where B=(S, θ) is a causal network on the variables $X_1, \ldots, X_n$, the causal contribution system 106 can perform the intervention $P(X_j|do(X_i=x))$. In particular, the causal contribution system 106 can perform a new causal network B'=(S', θ') such that S' is S after deleting all incoming edges into $X_i$ and θ' is θ but with $X_i$ set to x for all nodes in S' that were children of $X_i$ in S. The causal contribution system 106 can further determine the distribution $P_{B'}(X_j)$ by performing inference on the causal network B'. In some embodiments, this inferred distribution is the same as the distribution $P(X_j|do(X_i=x))$.

As mentioned above, the causal contribution system 106 can determine the causal contributions of particular dimension values on an anomalous dimension value based on the causal effects of the particular dimension values on corresponding dimension values from different dimensions. In some embodiments, the causal contribution system 106 determines the causal contributions further based on the marginal probabilities of the particular dimension values. In still further embodiments, the causal contribution system 106 determines the causal contributions based on anomalous marginal probabilities of the particular dimension values.

Figure 4:
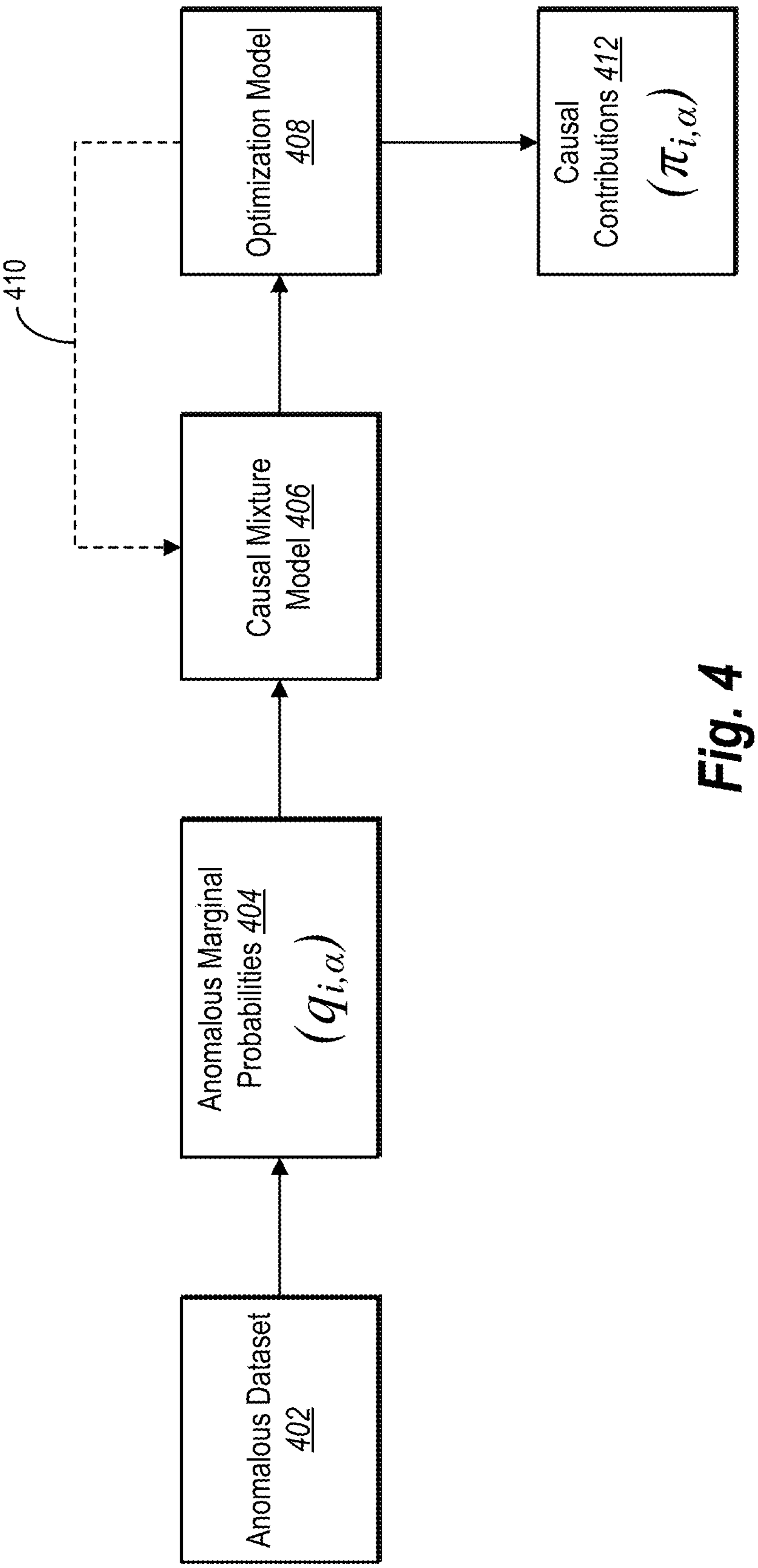
FIG. 4 illustrates a block diagram of the causal contribution system determining causal contributions of dimension values in accordance with one or more embodiments.

FIG. 4 illustrates a block diagram of the causal contribution system 106 determining the causal contributions of particular dimension values to an anomalous dimension value in accordance with one or more embodiments. In one or more embodiments, the causal contribution system 106 determines the causal contributions of the particular dimension values during a runtime mode. For example, the causal contribution system 106 can determine the causal contributions of the particular dimension values in response to a prompt from an administrator (e.g., via an administrator device).

In one or more embodiments, the causal contribution system 106 pre-processes an anomalous dataset 402 before determining causal contributions of the particular dimension values. For example, the causal contribution system 106 can pre-process the anomalous dataset 402 similar to the reference dataset as discussed above with reference to FIG. 3A (e.g., filter out sparsely populated columns, sampling the anomalous dataset 402, filling in missing dimension values). In some embodiments, the causal contribution system 106 further determines the number of occurrences within the anomalous dataset 402 (e.g., the pre-processed anomalous dataset). For purposes of notation, the causal contribution system 106 can represent the number of occurrences for a dimension value α of dimension i as $N_{i,\alpha}$. In some embodiments, the number of occurrences determined by the causal contribution system 106 for a particular dimension value represents an observed dimension value (e.g., an observed count value for the dimension value).

As further shown in FIG. 4, and as discussed above with reference to FIG. 2, the causal contribution system 106 identifies the anomalous dataset 402. Further, the causal contribution system 106 can identify an anomalous dimension value within the anomalous dataset 402. As an example, in some embodiments, the causal contribution system 106 periodically surveys the digital data stored in a database (e.g., surveys newly stored digital data every few weeks, every month). In some cases, while surveying the digital data, the causal contribution system 106 can compare dimension values within the digital data being surveyed with thresholds to determine an anomaly. Indeed, having previously established an expected representation of a dimension value within a dataset, the causal contribution system 106 can establish a threshold that, when satisfied by that dimension value, will be considered to reflect an unexpected representation of that dimension value within the surveyed data (e.g., an anomalous dimension value). The causal contribution system 106 can further determine the dataset within which the anomalous dimension value was identified (e.g., the digital data surveyed at the time the anomalous dimension value was identified) to comprise the anomalous dataset.

As further illustrated by FIG. 4, the causal contribution system 106 determines anomalous marginal probabilities 404 of particular dimension values represented in the anomalous dataset 402. In particular, the causal contribution system 106 can determine the anomalous marginal probabilities 404 for the same dimension values for which the marginal probabilities and/or the causal effects have been determined. In one or more embodiments, the causal contribution system 106 determines the anomalous marginal probabilities 404 in a similar manner as discussed above with regard to the marginal probabilities of the dimension values. In other words, the causal contribution system 106 can determine the anomalous marginal probabilities by identifying a number of occurrences of each dimension value from the particular dimension values within the anomalous dataset and comparing the number of occurrences of each dimension value to a number of events within the anomalous dataset. For purposes of notation, the causal contribution system 106 can represent the anomalous marginal probability of a dimension value $\alpha$ of dimension i as a $q_{i,\alpha}$. In some embodiments, the anomalous marginal probabilities of the particular dimension values represent expected values of the marginal probabilities for the particular dimension values within the anomalous dataset 402.

As further illustrated by FIG. 4, the causal contribution system 106 utilizes a causal mixture model 406 to determine the causal contributions of a particular dimension value to the anomalous dimension value. In one or more embodiments, the causal mixture model 406 models the anomalous marginal probabilities 404 of the particular dimension values as a function of the marginal probabilities of the particular dimension values, the causal effects of the particular dimension values (e.g., interventional marginal probabilities corresponding to the particular dimension values), and the causal contributions of the particular dimension values (e.g., interventional probabilities of the particular dimension values contributing to the anomalous dimension value). In particular, in one or more embodiments, the causal contribution system 106 utilizes the causal mixture model 406 to model the anomalous marginal probabilities as follows:

$$q_{i,\alpha} = p_{i,\alpha}\left(1 - \sum_{j\in[n]}\sum_{\beta\in C_j}\pi_{j,\beta}\right) + \sum_{j\in[n]}\sum_{\beta\in C_j}\pi_{j,\beta}\Delta_{j,\beta}(i,\alpha) + \pi_{i,\alpha} \tag{7}$$

As shown above in function 7, $q_{i,\alpha}$ represents the anomalous marginal probability for dimension value $\alpha$ of dimension i, $p_{i,\alpha}$ represents the marginal probability or non-anomolous marginal probability, $\Delta_{j,\beta}(i, \alpha)$ represents the causal effect of (j, $\beta$) on (i, $\alpha$), and $\pi_{i,\alpha}$ represents the causal contribution of the pair of dimension i and dimension value $\alpha$. As seen in function 7, the causal contributions of the dimension values to the anomalous dimension value includes values indicating weighted contributions of the causal effects of the particular dimension values to the anomalous marginal probabilities within the causal mixture model 406. In other words, via the causal mixture model 406, the causal contribution system 106 models the causal contribution of a dimension-dimension value pair (i, $\alpha$) as the contribution of the corresponding interventional distribution to the mixture in the anomalous dataset 402, which is the same as $\pi_{i,\alpha}$—the probability of occurrence of that intervention where i=$\alpha$. In one or more embodiments, the causal contribution system 106 utilizes the causal mixture model 406 to determine a set of functions where function 7 applies to each dimension value of each dimension represented in the anomalous dataset 402.

As further shown in FIG. 4, the causal contribution system 106 further utilizes the optimization model 408. Indeed, in some embodiments, the causal contribution system 106 utilizes the optimization model 408 to minimize errors introduced into the set of functions. In particular, the causal contribution system 106 can utilize the causal mixture model 406 to determine the causal contributions of the dimension values to the anomalous dimension value by solving the set of functions. In some embodiments, the causal contribution system 106 compares the anomalous marginal probabilities for the dimension values to their corresponding observed values (e.g., the observed dimension values represented as $N_{i,\alpha}$). Because the observed dimension values are estimated from a sample of the anomalous dataset 402, inaccuracies may be present, which can introduce errors in the set of functions.

Accordingly, the causal contribution system 106 can utilize the optimization model 408 to minimize the distance between the expected values of the anomalous marginal probabilities and the corresponding observed values. In other words, the causal contribution system 106 can utilize the optimization model to minimize, for a selected dimension, a difference between expected dimension values occurring within the anomalous dataset according to the anomalous marginal probabilities and observed dimension values occurring within the anomalous dataset (e.g., minimize the error). In one or more embodiments, the causal contribution system 106 defines an objective function of the optimization model 408 as a maximum (over dimensions) L2-norm between the observed dimension values (e.g., the observed number of occurrences of the dimension values) and the expected dimension values (e.g., the expected number of occurrences of the dimension values) as follows:

$$\mathcal{L}\left(\prod\right) = \max_i \sum_{\alpha\in C_i}\left(N_{i,\alpha} - Nq_{i,\alpha}\right)^2 \tag{8}$$

In function 8, $N_{i,\alpha}$ represents the observed dimension values and $Nq_{i,\alpha}$ represents the expected dimension values. Further, N represents the total number of rows in the anomalous dataset 402. Further, $$\prod \overset{deff}{=} (\pi_{i,\alpha})_{i\in[n],\alpha\in C_i}.$$

As shown in FIG. 4, the causal contribution system 106 determines, for each dimension from the plurality of dimensions, expected dimension values occurring within the anomalous dataset according to the anomalous marginal probabilities. The causal contribution system 106 further determines, for each dimension from the plurality of dimensions, observed dimension values occurring within the anomalous dataset. Using the optimization model 408, the causal contribution system 106 minimizes, for each dimension from the plurality of dimensions, a difference between the expected dimension values and the observed dimension values.

In some embodiments, the causal contribution system 106 minimizes the differences based on minimizing the maximum difference among expected dimension values and observed dimension values. In particular, the causal contribution system 106 can select the node from the causal network that represents the maximum difference or error between $N_{i,\alpha}$ and $Nq_{i,\alpha}$ and minimize the differences of each dimension value by minimizing that maximum difference.

To provide an illustration, the causal contribution system 106 combines, for each dimension associated with the dimension values, a plurality of differences between particular expected dimension values occurring within the anomalous dataset according to the anomalous marginal probabilities and particular observed dimension values occurring within the anomalous dataset. The causal contribution system 106 further identifies a dimension associated with a maximum combined difference. In one or more embodiments, the causal contribution system 106 determines a causal contribution of a particular dimension value based on minimizing the maximum combined difference utilizing the optimization model.

In one or more embodiments, the causal contribution system 106 further applies one or more constraints via the optimization model 408. For example, the causal contribution system 106 can define the causal contributions of dimension values as probabilities. Accordingly, the causal contribution system 106 applies the following:

$$0 \leq \pi_{i,\alpha} \leq 1 \; \forall i \in [n], \alpha \in C_i \tag{9}$$

In some embodiments, the causal contribution system 106 assumes that, on a single hit, either no anomaly originates or an anomaly originates at some $X_i=\alpha(\alpha \in C_i)$. These cases are disjoint (e.g., mutually exclusive), therefore, the causal contribution system 106 utilizes the following:

$$0 \leq \sum_{i \in [n]} \sum_{\alpha \in C_i} \pi_{i,\alpha} \leq 1 \tag{10}$$

In some instances, the causal contribution system 106 ensures identifiability by applying an equality constraint to the objective function. In particular, for any $i \in [n]$, an identifiability issue may arise upon assuming that all $\pi_{i,\alpha}$ are unknown. To illustrate, where there are two possible events and a first intervention sets the probability of the first event to $\theta$ and a second intervention sets the probability of the second event to $\phi$, the interventions are done with the respective probabilities in a total of N events. The causal contribution system 106 can estimate $\theta$ and $\phi$ using the distribution of the observed random variable (e.g., using Pr[E1] and Pr[E2] from the observations). In particular, in the observations, the causal contribution system 106 can determine the following:

$$Pr[E1] = \frac{1}{2}(1-\theta-\phi)+\theta = \frac{1}{2}+\frac{(\theta-\phi)}{2} \tag{11}$$

$$Pr[E2] = \frac{1}{2}(1-\theta-\phi)+\phi = \frac{1}{2}+\frac{(\phi-\theta)}{2} \tag{12}$$

Because Pr[E1]+Pr[E2]=1, the causal contribution system 106 can determine that functions 11 and 12 are the same. Therefore, the causal contribution system 106 has a single equation in $\theta$ and $\phi$ having values that cannot be determined. Based on this single equation, the causal contribution system 106 may have difficulty in identifying the variables $\theta$ and $\phi$. To make the problem more identifiable, the causal contribution system 106 can add another constraint on the variables. Accordingly, in one or more embodiments, the causal contribution system 106 determines that, for every $i \in [n]$, $\exists \alpha \in C_i$, such that:

$$\pi_{i,\alpha}=0 \tag{13}$$

In other words, function 13 indicates that there will be at least one dimension value for every dimension that does not contribution to the anomalous dimension value. In some embodiments, the causal contribution system 106 modifies the constraint associated with function 13 so that, for every $i \in [n]$:

$$\prod_{\alpha \in C_i} \pi_{i,\alpha} = 0 \tag{14}$$

In some embodiments, the causal contribution system 106 modifies function 14 further using a parameter $\varepsilon$ such that, for $\varepsilon=0$, the causal contribution system 106 recovers the original constraint represented by function 13. In particular, the causal contribution system 106 can modify function 14 as follows:

$$\min_{\alpha \in C_i} \pi_{i,\alpha} \leq \epsilon \forall \, i \in [n] \tag{15}$$

In one or more embodiments, the objective function represented by function 8 is piece-wise quadratic and the constraints represented by functions 9-10 and 13-15 are either liner or piecewise linear. As further indicated above, the causal contribution system 106 solves the set of functions utilizing the causal mixture model 406 and the optimization model 408 based on an iterative approach (as indicated by the dashed line 410). For example, the causal contribution system 106 can utilize an iterative sequential quadratic programming algorithm. Accordingly, the causal contribution system 106 can determine the causal contributions 412 of particular dimension values to the anomalous dimension value. By determining a causal contribution for each dimension value from particular dimension values, the causal contribution system 106 generates a distribution of causal contributions of the particular dimension values to the anomalous dimension value.

In one or more embodiments, the causal contribution for a particular dimension value provides the contribution of the dimension value to the anomalous portion of the anomalous dimension value's representation within the anomalous dataset 402. For example, for an anomalous dimension value having a greater representation than expected, the causal contribution can indicate the contribution of the particular dimension value to that portion of the representation that extended beyond the expected representation. In some embodiments, however, the causal contribution for a particular dimension value indicates the contribution of that dimension value to the entire representation of the dimension value within the anomalous dataset 402.

In some embodiments, based on the causal contributions 412, the causal contribution system 106 generates a causal-contribution ranking as will be described below with reference to FIG. 7. Indeed, the causal contribution system 106 can assign a ranking to the dimension values based on their causal contributions to the anomalous dimension values. In some embodiments, the causal contribution system 106 can generate a ranked list or sequence based on the causal-contribution ranking.

Thus, the causal contribution system 106 can determine how particular dimension values contribution to an anomalous dimension value based on the causal effects of the particular dimension values on corresponding dimension values. Because the causal effects are determined using a causal network generated based on a reference dataset, the causal contribution system 106 also determines the causal contributions of the dimension values based on the reference dataset. Accordingly, the algorithm and acts described with reference to FIG. 4 can comprise the corresponding structure for performing a step for generating a distribution of causal contributions of particular dimension values to the anomalous dimension value based on a reference dataset for the reference time period.

By determining causal contributions of particular dimension values based on the causal effects of those dimension values on corresponding dimension values from different dimensions, the causal contribution system 106 can operate more flexibly than conventional data analysis systems. In particular, the causal contribution system 106 can more flexibly determine the contributions of dimension values based on data characteristics other than the mere face-value representation of the dimension values within a dataset. Indeed, the causal contribution system 106 can flexibly determine whether the representation of those dimension values is caused by other dimension values represented within the dataset and flexibly adjust the determined contributions of those dimension values to the anomalous dimension value accordingly.

Further, the causal contribution system 106 can operate more accurately than conventional systems. In particular, by determining causal contributions of particular dimension values based on corresponding causal effects, the causal contribution system 106 can more accurately determine the contribution of a dimension value to an anomaly within a dataset. As mentioned above, the causal contribution system 106 can adjust the contribution associated with a dimension value based on determining how that dimension value is influenced by other dimension values. Accordingly, the causal contribution system 106 avoids attributing credit to a dimension value when at least part of that dimension values contribution was actually caused by another dimension value.

Figure 5:
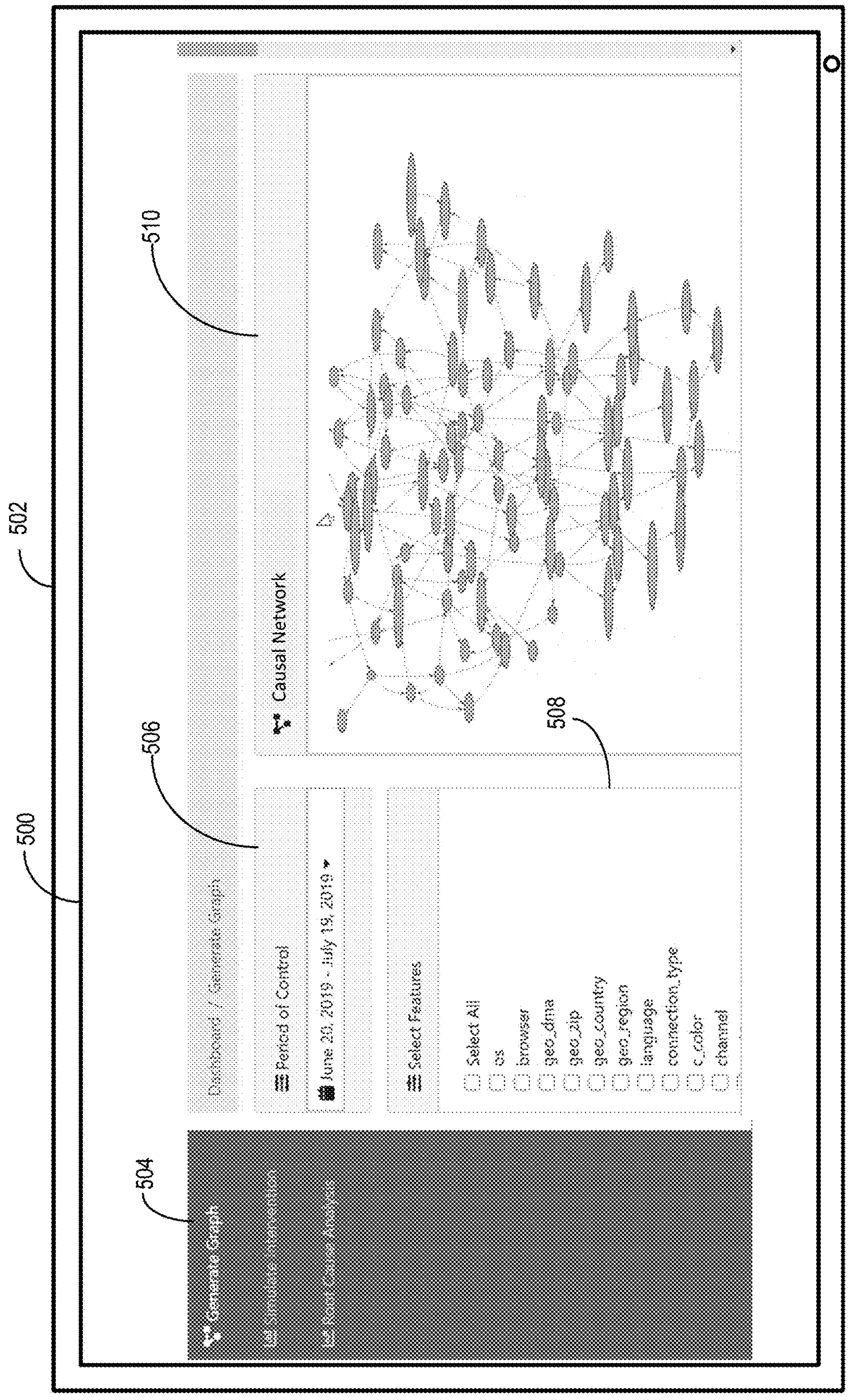
FIG. 5 illustrates a graphical user interface for displaying a causal network in accordance with one or more embodiments.
Figure 6:
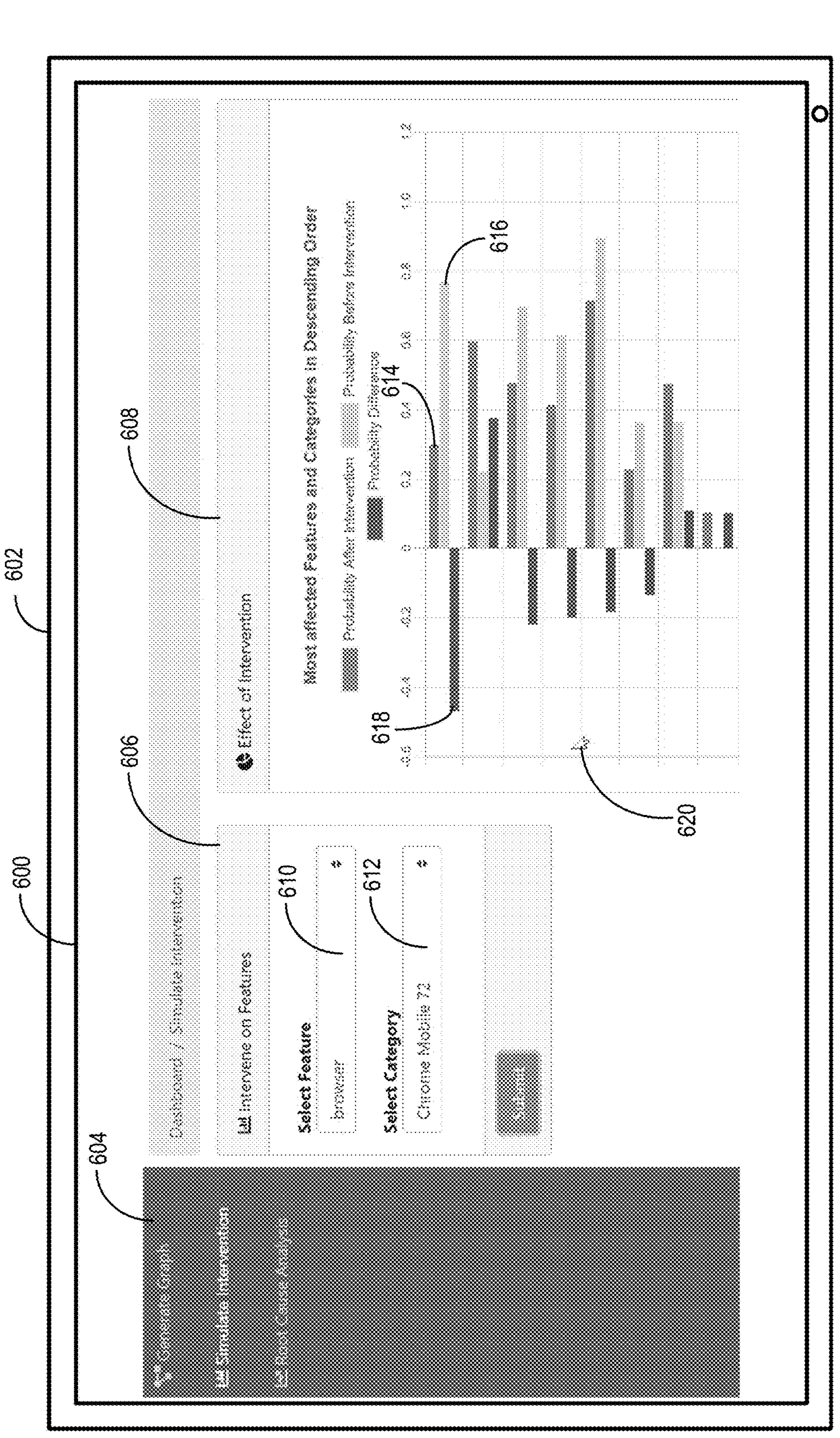
FIG. 6 illustrates a graphical use interface for displaying intervention results in accordance with one or more embodiments.

In one or more embodiments, the causal contribution system 106 utilizes various graphical user interfaces. For example, the causal contribution system 106 can provide one or more data for display within graphical user interfaces on a client device. In particular, in one or more embodiments, the client device includes the administrator device 110 discussed above with reference to FIG. 1. The causal contribution system 106 can receive indications of user interactions from the client device via a graphical user interface. In some embodiments, the causal contribution system 106 provides digital reports for display on the client device via a graphical user interface. FIGS. 5-7 illustrate graphical user interfaces presented by a client device based on data provided by the causal contribution system 106 in accordance with one or more embodiments.

In particular, FIG. 5 illustrates a graphical user interface 500 used by the causal contribution system 106 to display a causal network on a client device 502 in accordance with one or more embodiments. As shown in FIG. 5, the graphical user interface 500 includes a menu area 504, a time period area 506, a dimension selection area 508, and a network display area 510. It should be noted, however, that the graphical user interface 500 (as well as those discussed with reference to FIGS. 6-8) is merely exemplary, and the areas and selectable options within each area can vary in different embodiments.

As shown in FIG. 5, the causal contribution system 106 can receive, from the client device 502, an indication of a selection of the "Generate Graph" option within the menu area 504 of the graphical user interface 500. In one or more embodiments, in response to receiving a selection of the "Generate Graph" option, the causal contribution system 106 provides data representing the time period area 506, the dimension selection area 508, and the network display area 510 for display within the graphical user interface 500.

Additionally, the causal contribution system 106 can receive, from the client device 502, an indication of a selection of a time period within the time period area 506. For example, the causal contribution system 106 can receive an indication of, within the time period area 506, a selection of a reference time period corresponding to a reference dataset to be used for determining the causal effects of particular dimension values on corresponding dimension values from different dimensions. Further, the causal contribution system 106 can receive an indication of a selection of one or more dimensions within the dimension selection area 508. For example, the causal contribution system 106 can receive a selection of all dimensions represented in a dataset (e.g., the dataset corresponding to the time period selected within the time period area 506) or a selection of a subset of the dimensions represented in a dataset.

As illustrated by FIG. 5, the client device 502 can present a causal network within the network display area 510. In particular, the client device 502 can display a causal network that corresponds to the time period selection received via the time period area 506 and the dimension selection(s) received via the dimension selection area 508. In one or more embodiments, the causal contribution system 106 generates the causal network for display within the network display area 510 as discussed above with reference to FIG. 3A. In some embodiments, upon receiving additional dimension selections or deselections via the dimension selection area 508, the causal contribution system 106 can modify the causal network displayed in the network display area 510.

FIG. 6 illustrates a graphical user interface 600 used by the causal contribution system 106 to display intervention results on a client device 602 in accordance with one or more embodiments. As shown in FIG. 6, the graphical user interface 600 includes a menu area 604, a dimension value selection area 606, and an intervention results area 608.

As shown in FIG. 6, the causal contribution system 106 can receive, from the client device 602, an indication of a selection of the "Simulate Intervention" option within the menu area 604 of the graphical user interface 600. In one or more embodiments, in response to receiving the indication of the selection of the "Simulate Intervention" option, the causal contribution system 106 provides data representing the dimension value selection area 606 and the intervention results area 608 for display within the graphical user interface 600.

Additionally, the causal contribution system 106 can receive, from the client device 602, an indication of a selection of a dimension value within the dimension value selection area 606. For example, the causal contribution system 106 can receive an indication of a selection of a dimension via the dimension selection drop-down menu 610. In one or more embodiments, upon receiving an indication of a selection of a dimension, the client device 602 provides data representing dimension values that correspond to the selected dimension for display within the dimension value selection drop-down menu 612. The causal contribution system 106 can receive an indication of a selection of a dimension value associated with the selected dimension via the dimension value selection drop-down menu 612.

As further illustrated by FIG. 6, the causal contribution system 106 can provide data representing intervention results to the client device 602. In response, the client device 602 can display the intervention results within the intervention results area 608 of the graphical user interface 600. In particular, the client device 602 can display the results of an intervention on a causal network that corresponds to the dimension value selection received via the dimension value selection drop-down menu 612. Indeed, the causal contribution system 106 can simulate an intervention (e.g., generate an interventional network) that corresponds to the selected dimension value as discussed above with reference to FIG. 3C.

As further shown in FIG. 6, the causal contribution system 106 can provide data representing values corresponding to the simulated intervention for display (e.g., as part of the intervention results). In response, the client device 602 can display these values within the intervention results area 608 of the graphical user interface 600. In particular, the client device 602 can display marginal probabilities corresponding to contributions of the selected dimension value to dimension values of other dimensions before an intervention within the causal network (e.g., a marginal probability corresponding to the contribution of the selected dimension value to another dimension value being represented by a bar 614). Further, the client device 602 can display interventional marginal probabilities corresponding to contributions of the selected dimension value to the dimension values after the intervention within the causal network (e.g., an interventional marginal probability corresponding to the contribution of the selection dimension value to the other dimension value being represented by a bar 616).

In some embodiments, the client device 602 further displays values corresponding to the difference between the marginal probabilities and the interventional marginal probabilities (e.g., the difference between the marginal probability and the interventional marginal probability corresponding to the other dimension value being represented by a bar 618). In other words, the intervention results can show the causal effect of the selected dimension value on the other dimension values within a dataset (e.g., within a causal network or reference dataset).

In one or more embodiments, upon receiving, from the client device 602, an indication of a user selection of one of the bars corresponding to a particular dimension value (e.g., via hovering over one of the bars using the cursor 620), the causal contribution system 106 provides data representing more detailed data related to the probabilities (e.g., the name of the dimension value, a more detailed probability). In some embodiments, the causal contribution system 106 can provide more or less probabilities for a particular dimension value (e.g., more or less bars corresponding to a particular dimension value) in response to receiving an indication of a user selection.

Figure 7:
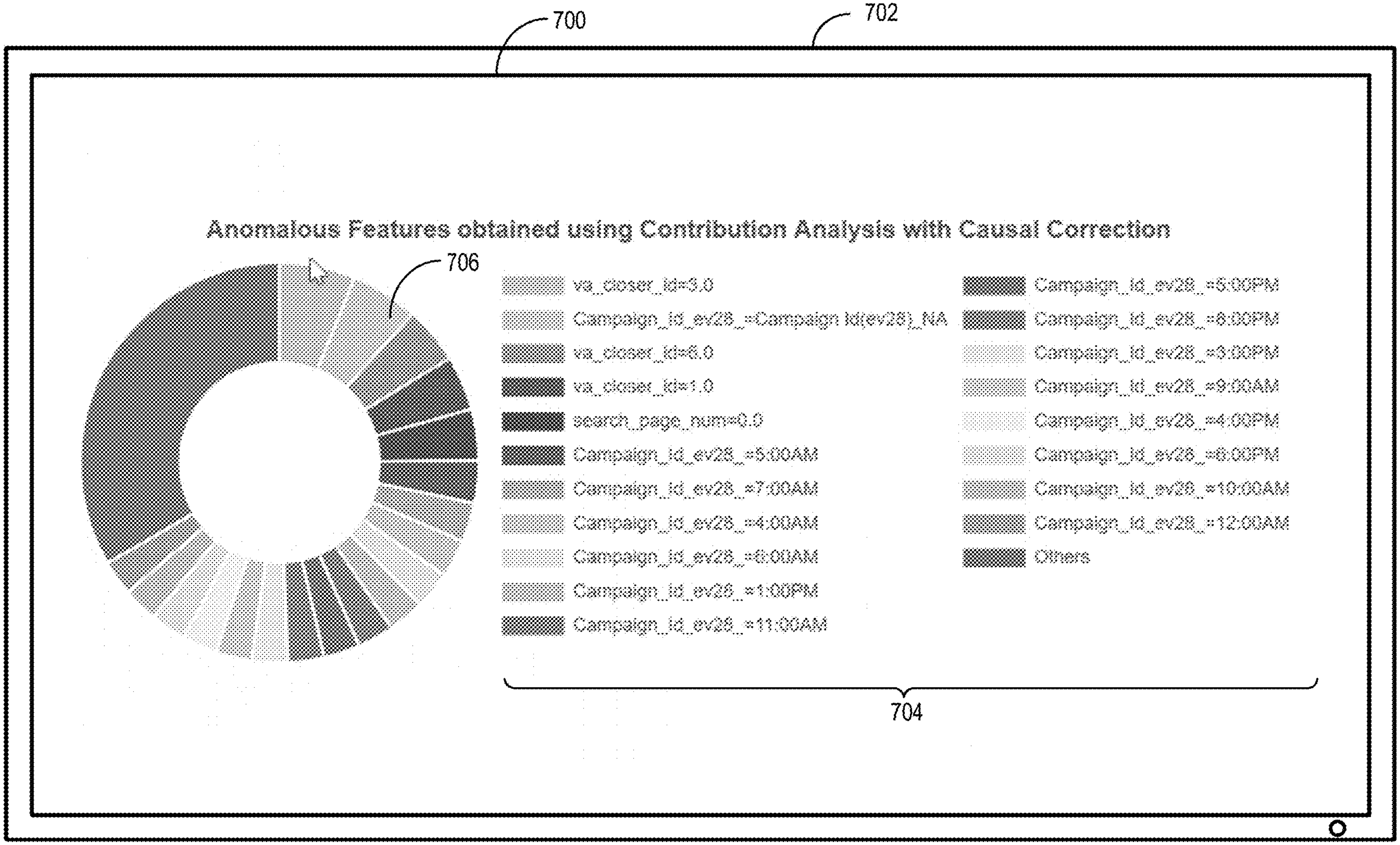
FIG. 7 illustrates a graphical user interface for displaying a causal-contribution ranking in accordance with one or more embodiments.

FIG. 7 illustrates a graphical user interface 700 used by the causal contribution system 106 to display a causal-contribution ranking on a client device 702 in accordance with one or more embodiments. Indeed, as discussed above, the causal contribution system 106 can determine causal contributions of particular dimension values to an anomalous dimension value and generate a causal-contribution ranking based on the determined causal contributions. In one or more embodiments, the causal contribution system 106 identifies, for display on the graphical user interface 700, a dimension value as contributing to the anomalous dimension value based on the causal-contribution ranking of the particular dimension values. In some embodiments, the causal contribution system 106 identifies, for display, several dimension values as contributing to the anomalous dimension value. Accordingly, the causal contribution system 106 can provide, for display, data representing the identified dimension values' contribution to the anomalous dimension value according to the causal contribution ranking. In response, the client device 702 can display a graphical visualization of identified dimension values' contributions to the anomalous dimension value within the graphical user interface 700.

For example, in one or more embodiments, the causal contribution system 106 identifies a subset of dimension values from the particular dimension values corresponding to highest contributions to the anomalous dimension value based on the causal-contribution ranking of the particular dimension values and a threshold contribution for dimension values. To illustrate, the causal contribution system 106 can identify a pre-determined number of the highest-contributing dimension values. The causal contribution system 106 can provide, for display by the client device 702, data representing the subset of dimension values.

In one or more embodiments, the causal contribution system 106 generates a ranked list of dimension values based on the causal-contribution ranking and provides data representing the ranked list for display by the client device 702 via the graphical user interface 700. Indeed, as shown in FIG. 7, the causal contribution system 106 provides data representing a ranked list 704 that indicates the dimension values and corresponding dimensions that contributed to the anomalous dimension value. As illustrated by FIG. 7, the ranked list 704 can organize the dimension values in descending order with the highest-contributing dimension value at the top of the ranked list. 704. The causal contribution system 106, however, can utilize various other organizational methods for the ranked list 704.

As further shown in FIG. 7, the causal contribution system 106 can also provide data representing a visual element 706 for display within the graphical user interface 700. In particular, the visual element 706 can provide a visual indication of the degree to which a particular dimension value contributed to an anomalous dimension value. In one or more embodiments, the causal contribution system 106 provides data representing indications of how dimension values from the ranked list are related to segments of the visual element 706. For example, as shown in FIG. 7, the causal contribution system 106 can coordinate colors between segments of the visual element 706 and the ranked list 704 to provide an intuitive visualization of the contributions of the dimension values.

FIG. 8 illustrates a comparison between a contribution ranking list 804 and a causal-contribution ranking list 806 generated by the causal contribution system 106 in accordance with one or more embodiments. In particular, the contribution ranking list 804 provides a contribution ranking of dimension values to an anomalous dimension value without accounting for the causal effects of dimension values on corresponding dimension values from different dimensions. By contrast, the causal-contribution ranking list 806 provides a causal-contribution ranking that accounts for such causal effects.

As shown in FIG. 8, by accounting for the causal effects of dimension values on corresponding dimension values from different dimensions, the causal contribution system 106 reduces redundancy within the resulting causal-contribution ranking. For example, the contribution ranking list 804 lists a dimension value "Store: Mobile&Accessories"

for the "post_pagename" dimension and a "Mobile" dimension value for the "post_pagename" dimension, which are closely related (e.g., one likely has a causal effect on another). By contrast, the causal-contribution ranking list 806 does not include such a redundancy. Thus, by accounting for the causal effects of dimension values, the causal contribution system 106 can generate a ranked list that identifies a greater number of unique dimension values as contributing to an anomalous dimension value.

Figure 10:
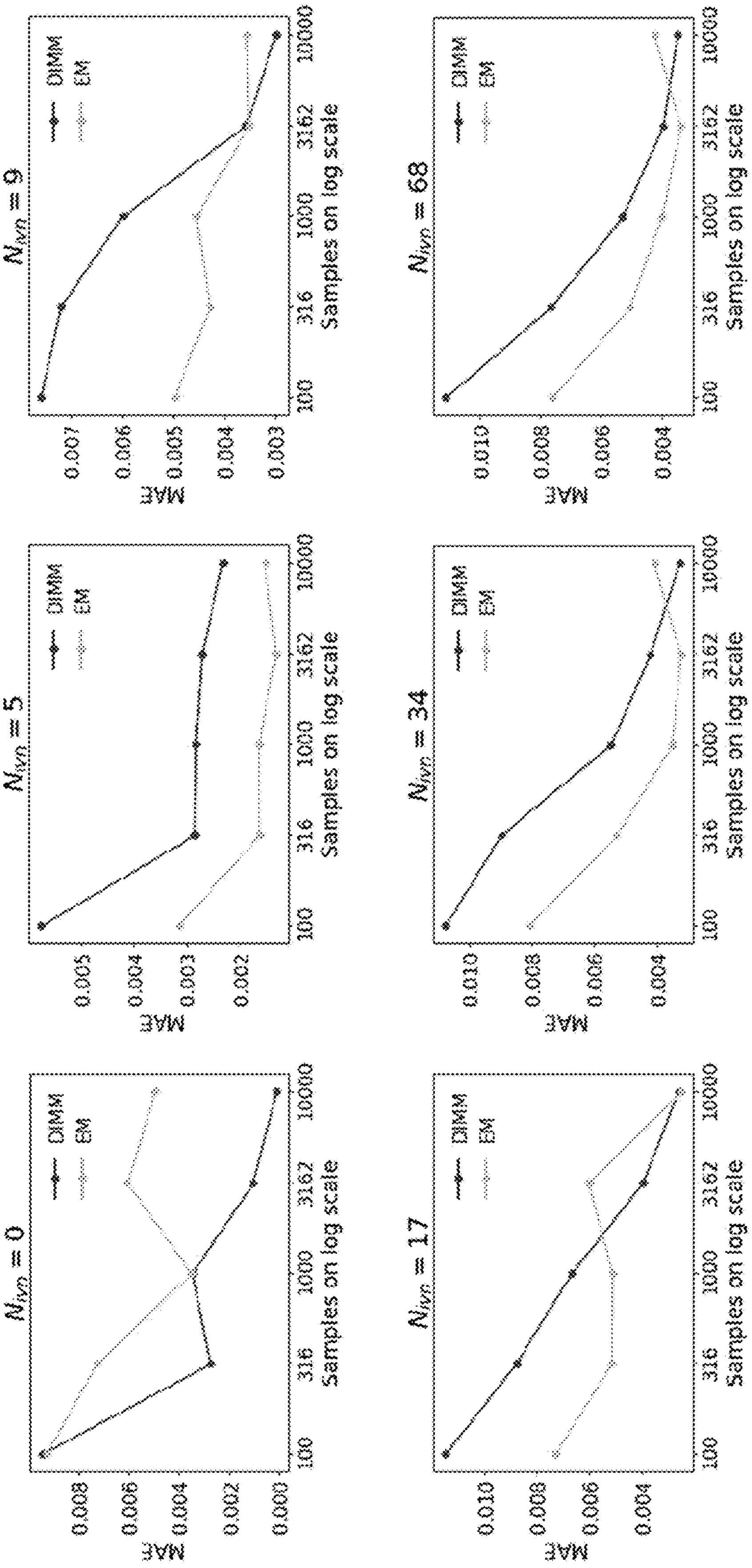
FIG. 10 illustrates various graphs reflecting further experimental results regarding the effectiveness of the causal contribution system in accordance with one or more embodiments.
Figure 11:
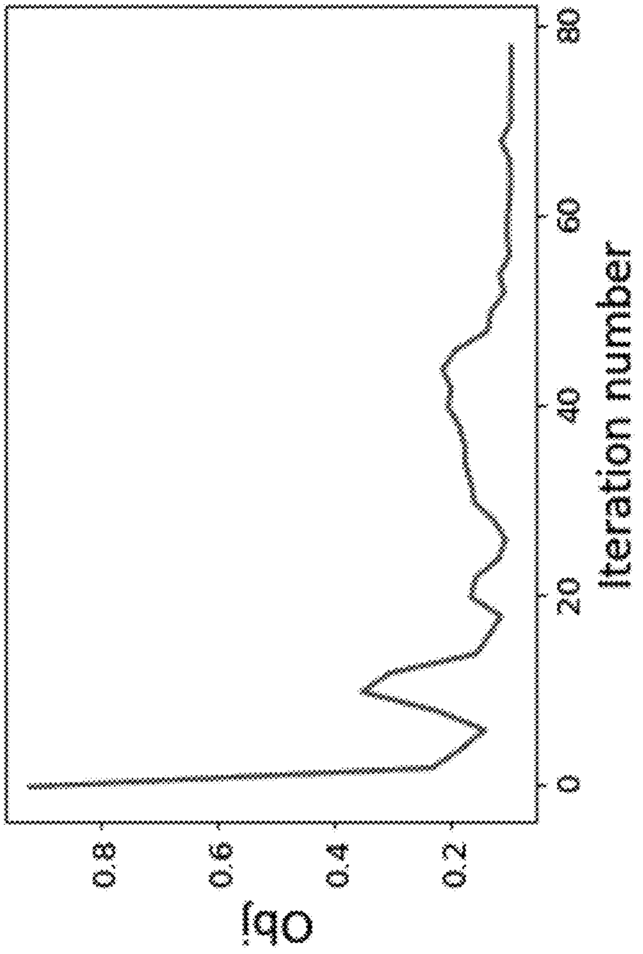
FIG. 11 illustrates another graph reflecting further experimental results regarding the effectiveness of the causal contribution system in accordance with one or more embodiments.

As mentioned above, the causal contribution system 106 can operate more accurately than conventional systems. In particular, by determining causal contributions based on the causal effects of dimension values on corresponding dimension values from different dimensions, the causal contribution system 106 can more accurately determine how a particular dimension value contributes to an anomalous dimension value. Researchers have conducted studies to determine the accuracy of one or more embodiments of the causal contribution system 106 using various datasets. FIGS. 9-11 each illustrate experimental results regarding the effectiveness of the causal contribution system 106 in accordance with one or more embodiments.

In particular, FIG. 9 illustrates a table reflecting experimental results of a study performed using A Logical Alarm Reduction Mechanism (ALARM) data. In particular, the ALARM approach utilizes a causal Bayesian network on categorical variables (i.e., dimension values). In particular, the network is fully connected with 37 nodes connected by 46 edges with a maximum in-degree of 4. The network includes a total of 105 dimensions with each node taking 2 to 4 dimension values. In one or more embodiments, the causal contribution system 106 implements the ALARM approach as described by Ingo A. Beinlich et al., *The ALARM Monitoring System: A Case Study With Two Probabilistic Inference Techniques For Belief Networks*, AIME 89, pp. 247-256 (1989), which is incorporated herein by reference in its entirety.

In the study, the researchers utilized the variable elimination inference algorithm to determine the marginal probabilities and the causal effects associated with the dimension values. The researchers further generated the anomalous dataset using a mixture of the interventional distributions based on some fixed values of the intervention probabilities represented as above using $\pi_{i,\alpha}$ for $i\in[n]$, $\alpha\in C_i$. For $m\in\mathbb{N}$, the researchers sampled m independent instances from the interventional distributions chosen with probabilities $\pi_{i,\alpha}$. Further, the researchers calculated the dimension value counts by aggregating over the samples.

Each problem instance utilized corresponds to a choice of $N_{ivn}$, which represents the number of interventional distributions contributing to the anomalous dataset. In particular, the researchers set the values of $N_{ivn}$ to {0, 5, 9, 17, 34, 68}. When $N_{ivn}=0$, the researchers set $\pi_{i,\alpha}=0$ for all $i\in[n]$, $\alpha\in C_i$. When $N_{ivn}\neq 0$, the researchers (1) randomly chose $\alpha_i\in C_i$ for $i\in[n]$ and set $\pi_{i,\alpha_i}=0$, and (2) randomly chose positive values for the remaining $\pi_{i,\alpha}$ where $\alpha(\neq\alpha_i)\in C_i$ such that:

$$\sum_{i=1}^{n}\sum_{\alpha(\neq\alpha_i)\in C_i}\pi_{i,\alpha}=0.8 \tag{16}$$

The researchers iteratively solved the problem instances using a Sequential Least Squares Programming (SLSQP) implementation. The researchers also added a $L_2$ regularization term to an objective for the objection function with regularization parameter $\lambda$ to address the noise. In particular, the researchers utilized $\lambda=0.1$ and $\varepsilon=1e-5$ after manual tuning.

The table of FIG. 9 measures the performance of one embodiment of the causal contribution system 106 using several metrics: Mean Squared Error (MSE); Mean Absolute Error (MAE); Maximum Absolute Representation Error (MABRE); and $\Delta(\Pi,\hat{\Pi})$. In particular, the causal contribution system 106 defines the latter metric as follows:

$$MSE=\frac{1}{N^c}\sum_{i=1}^{n}\sum_{\alpha\in C_i}(\pi_{i,\alpha}-\hat{\pi}_{i,\alpha})^2 \tag{17}$$

$$MAE=\frac{1}{N^c}\sum_{i=1}^{n}\sum_{\alpha\in C_i}|\pi_{i,\alpha}-\hat{\pi}_{i,\alpha}| \tag{18}$$

$$MABRE=\max_{i\in[n],\alpha\in C_i}|\pi_{i,\alpha}-\hat{\pi}_{i,\alpha}| \tag{19}$$

$$\Delta\left(\prod,\hat{\prod}\right)=\left|Obj\left(\prod\right)-Obj\left(\hat{\prod}\right)\right| \tag{20}$$

In functions 17 and 18, $N^C$ represents the total number of parameters to be received. In function 20, $\Pi=(\pi_{i,\alpha}: i\in[n], \alpha\in C_i)$ and represents the tuple of intervention probabilities used for creating the mixture. Further, $\hat{\Pi}=(\hat{\pi}_{i,\alpha}: i\in[n], \alpha\in C_i)$ and represents the tuple of intervention probabilities recovered by the causal contribution system 106. Further, Obj( ) is the value of the objective value from function 8 upon convergence.

The table of FIG. 9 shows a comparison between the true intervention probabilities $\Pi$ and the intervention probabilities $\hat{\Pi}$ recovered by the causal contribution system 106 for different problem instances $N_{ivn}$. In particular, the table of FIG. 9 shows small values across all of the error metrics, indicating that the causal contribution system 106 can recover the causal contributions of the dimension values with high accuracy. Even though the errors generally increase with the number of interventions, the results still show highly accurate performance.

FIG. 10 illustrates several graphs comparing the performance of at least one embodiment of the causal contribution system 106 (labeled "DIMM") against an Expectation-Maximization based maximum likelihood algorithm (labeled "EM"). In particular, the graphs of FIG. 10 illustrate the performance of each method using the ALARM data. For this comparison, however, the researchers used the samples generated from the mixture of distributions.

As shown in FIG. 10, the graphs measure the performance of the causal contribution system 106 and the Expectation-Maximization based maximum likelihood algorithm using the MAE metric. As shown by the graphs, even with only aggregate information, the causal contribution system 106 generally performs better when the distribution estimates are good (e.g., where there are a large number of samples used for estimates). As noted above, $N_{ivn}$ represents the number of interventional distributions contributing to an anomalous dataset. In each graph shown in FIG. 10, the causal contribution system 106 compares MAE in estimation of by DIMM and EM as a function of number of samples $N_s$ at different values of $N_{ivn}$. Even at lower numbers of samples, the causal contribution system 106 performs comparably to the Expectation-Maximization based maximum likelihood algorithm.

FIG. 11 illustrates a graph reflecting additional experimental results regarding the effectiveness of the causal contribution system 106 in accordance with one or more embodiments. In particular, the graph of FIG. 11 illustrates results of a study perform on a real-world e-commerce dataset that includes online click-stream data generated by user interactions on a website of an e-commerce company. The dataset consists of 32 dimensions that vary from user-specific attributes (e.g., city, country, zip) to hit-level features (e.g., hit source, page name, referrer type) and other visit-related features (e.g., browser, operating system, mobile id). Each row of the dataset records a separate hit on the website generated by user activities (e.g., purchase, product view, cart addition).

During the study, the researchers used pre-processed click-stream data from the dataset from a timer period where the metrics were stable to learn the causal Bayesian network between dimensions. From the learned network, the researchers used the Bayesian network to learn the CPDs, the marginal probabilities, and the causal effects. The researchers further queried another instance of the dataset that included a 27% positive anomaly in the "pageviews" dimension to form the anomalous dataset. The researchers determined the dimension value counts by aggregating the samples in the anomalous dataset, and the causal contribution system 106 operated to determine the causal contributions accordingly.

The graph of FIG. 11 shows the convergence of the objective function from function 8 utilized by the causal contribution system 106. In particular, the graph of FIG. 11 plots convergence of the objective function with respect to the number of iterations. As shown by the graph, the objective function gradually decreases before converging to a small value of 0.097.

As illustrated by the graph of FIG. 11, the causal contribution system 106 operates more efficiently than conventional systems. In particular, the graph of FIG. 11 illustrates the efficiency with which the causal contribution system 106 can reach convergence of the objective function, indicating an efficiency in determining the causal contributions of particular dimension values on an anomalous dimension value. Indeed, as mentioned above and as indicated the graph of FIG. 11, the causal contribution system 106 can reach convergence of the objective function on the order of seconds, reducing the computational time and processing required to determine the causal contributions for dimension values compared to conventional systems, the latter of which often require several minutes or even hours to reach convergence. As one example, EM operates across the entire dataset—which requires resources to analyze each row of data in a dataset—while the causal contribution system 106 operates on a sample of a dataset (e.g., sampled during the pre-processing of the data). Thus, the causal contribution system 106 spends less resources analyzing data and can converge more quickly.

Figure 12:
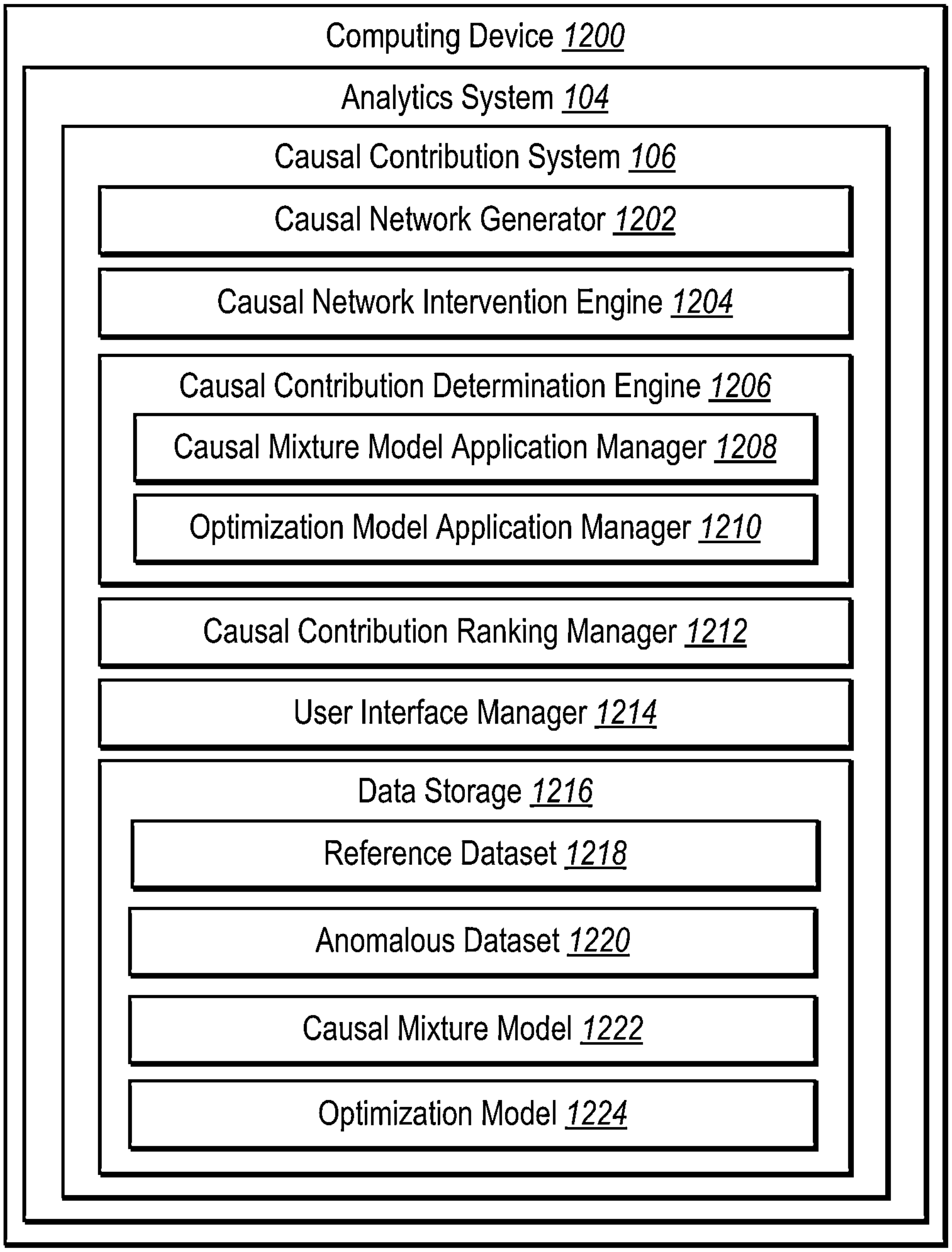
FIG. 12 illustrates an example schematic diagram of a causal contribution system in accordance with one or more embodiments.

Turning now to FIG. 12, additional detail will be provided regarding various components and capabilities of the causal contribution system 106. In particular, FIG. 12 illustrates the causal contribution system 106 implemented by the computing device 1200 (e.g., e.g., the server(s) 102, the administrative device 110, and/or one of the client devices 114*a*-114*n* as discussed above with reference to FIG. 1). Additionally, the causal contribution system 106 is also part of the analytics system 104. As shown, the causal contribution system 106 can include, but is not limited to, a causal network generator 1202, a causal network intervention engine 1204, a causal contribution determination engine 1206 (which includes a causal mixture model application manager 1208 and an optimization model application manager 1210), a causal contribution ranking manager 1212, a user interface manager 1214, and data storage 1216 (which includes a reference dataset 1218, an anomalous dataset 1220, a causal mixture model 1222, and an optimization model 1224).

As just mentioned, and as illustrated in FIG. 12, the causal contribution system 106 includes the causal network generator 1202. In particular, the causal network generator 1202 can generate a causal network based on a reference dataset. For example, the causal network generator 1202 can generate a causal network that includes nodes corresponding to the dimensions represented within the reference dataset and edges that show the dependencies that exist among the dimensions. In some embodiments, the causal network generator 1202 generates the causal network using a reference dataset that corresponds to a reference time period received via user selection by the user interface manager 1214.

In some embodiments, the causal network generator 1202 further determines various values based on the causal network and/or the reference dataset. For example, the causal network generator 1202 can, in some embodiments, determine CPDs associated with the dimension values represented in the causal network/reference dataset. Further, the causal network generator 1202 can determine marginal probabilities of the dimension values.

Additionally, as shown in FIG. 12, the causal contribution system 106 includes the causal network intervention engine 1204. In particular, the causal network intervention engine 1204 can simulate interventions on the causal network generated by the causal network generator 1202. For example, in some embodiments, the causal network intervention engine 1204 generates an interventional network for each dimension value represented in the causal network. Indeed, the causal network intervention engine 1204 can, for a dimension value, remove the edges coming into the node of the dimension associated with the dimension value and set the node to equal that dimension value. In some embodiments, the causal network intervention engine 1204 further determines interventional marginal probabilities (i.e., causal effects) of the dimension values based on the interventional networks.

Further, as shown in FIG. 12, the causal contribution system 106 includes the causal contribution determination engine 1206. In particular, the causal contribution determination engine 1206 determines the causal contributions of dimension values to an anomalous dimension value. Indeed, the causal contribution determination engine 1206 can determine causal contributions to an anomalous dimension value identified within an anomalous dataset. In some embodiments, the causal contribution determination engine 1206 identifies the anomalous dimension value from an anomalous dataset that corresponds to an anomalous time period received via user selection by the user interface manager 1214.

The causal contribution determination engine 1206 includes the causal mixture model application manager 1208. In particular, the causal mixture model application manager 1208 can apply a causal mixture model to determine the causal contributions of dimension values to the anomalous dimension value. For example, the causal mixture model application manager 1208 can utilize a causal mixture model that models anomalous marginal probabilities of the particular dimension values as a function of the marginal probabilities of the particular dimension values, the causal effects of the particular dimension values, and the causal contributions of the particular dimension values. The causal mixture model application manager 1208 can determine the causal contributions of the particular dimension values based on the model.

The causal contribution determination engine 1206 further includes the optimization model application manager 1210. In particular, the optimization model application manager 1210 can minimize, for a selected dimension, a difference between expected dimension values occurring within the anomalous dataset according to the anomalous marginal probabilities and observed dimension values occurring within the anomalous dataset. In one or more embodiments, the optimization model application manager 1210 operates along with the causal mixture model application manager 1208 to determine the causal contributions of the dimension values to the anomalous dimension value.

As shown in FIG. 12, the causal contribution system 106 also includes the causal contribution ranking manager 1212. In particular, the causal contribution ranking manager 1212 can generate a causal-contribution ranking based on the causal contributions of the dimension values determined by the causal contribution determination engine 1206. In one or more embodiments, the causal contribution ranking manager 1212 can generate the causal-contribution ranking within a ranked list. For example, in some embodiments, the causal contribution ranking manager 1212 generates a ranked list that includes a subset of the dimension values that correspond to the highest contributions to the anomalous dimension value.

Additionally, as shown in FIG. 12, the causal contribution system 106 includes the user interface manager 1214. In particular, the user interface manager 1214 can receive user interactions and/or provide digital data via a graphical user interface displayed on a client device (e.g., an administrator device). For example, the user interface manager 1214 can receive user selection of a reference time period for a reference dataset and/or an anomalous time period for an anomalous dataset. Additionally, the user interface manager 1214 can receive user interactions and provide a causal network and/or intervention results accordingly. Further, the user interface manager 1214 can provide one or more dimension values as contributing to the anomalous dimension value based on the causal-contribution ranking generated by the causal contribution ranking manager 1212. In particular, the user interface manager 1214 can provide a graphic visualization of selected dimension values, such as a subset of dimension values corresponding to the highest contributions.

As shown in FIG. 12, the causal contribution system 106 further includes data storage 1216. In particular, data storage 1216 includes the reference dataset 1218, the anomalous dataset 1220, the causal mixture model 1222, and the optimization model 1224. The reference dataset 1218 can include data (e.g., dimension values) included in a reference dataset. The anomalous dataset 1220 can include data (e.g., dimension values) included in an anomalous dataset, including an anomalous dimension value. The causal mixture model 1222 and the can include the causal mixture model utilized by the causal mixture model application manager 1208 to determine the causal contributions of dimension values to an anomalous dimension value. Similarly, the optimization model 1224 can include the optimization model utilized by the optimization model application manager 1210 to determine the causal contributions of the dimension values to the anomalous dimension value.

Each of the components 1202-1224 of the causal contribution system 106 can include software, hardware, or both. For example, the components 1202-1224 can include one or more instructions stored on a computer-readable storage medium and executable by processors of one or more computing devices, such as a client device, administrator device, or server device. When executed by the one or more processors, the computer-executable instructions of the causal contribution system 106 can cause the computing device(s) to perform the methods described herein. Alternatively, the components 1202-1224 can include hardware, such as a special-purpose processing device to perform a certain function or group of functions. Alternatively, the components 1202-1224 of the causal contribution system 106 can include a combination of computer-executable instructions and hardware.

Furthermore, the components 1202-1224 of the causal contribution system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1202-1224 of the causal contribution system 106 may be implemented as a stand-alone application, such as a desktop or mobile application. Furthermore, the components 1202-1224 of the causal contribution system 106 may be implemented as one or more web-based applications hosted on a remote server. Alternatively, or additionally, the components 1202-1224 of the causal contribution system 106 may be implemented in a suite of mobile device applications or "apps." For example, in one or more embodiments, the causal contribution system 106 can comprise or operate in connection with digital software applications such as ADOBE® ANALYTICS or ADOBE® EXPERIENCE CLOUD®. "ADOBE" and "EXPERIENCE CLOUD" are either registered trademarks or trademarks of Adobe Inc. in the United States and/or other countries.

Figure 13:
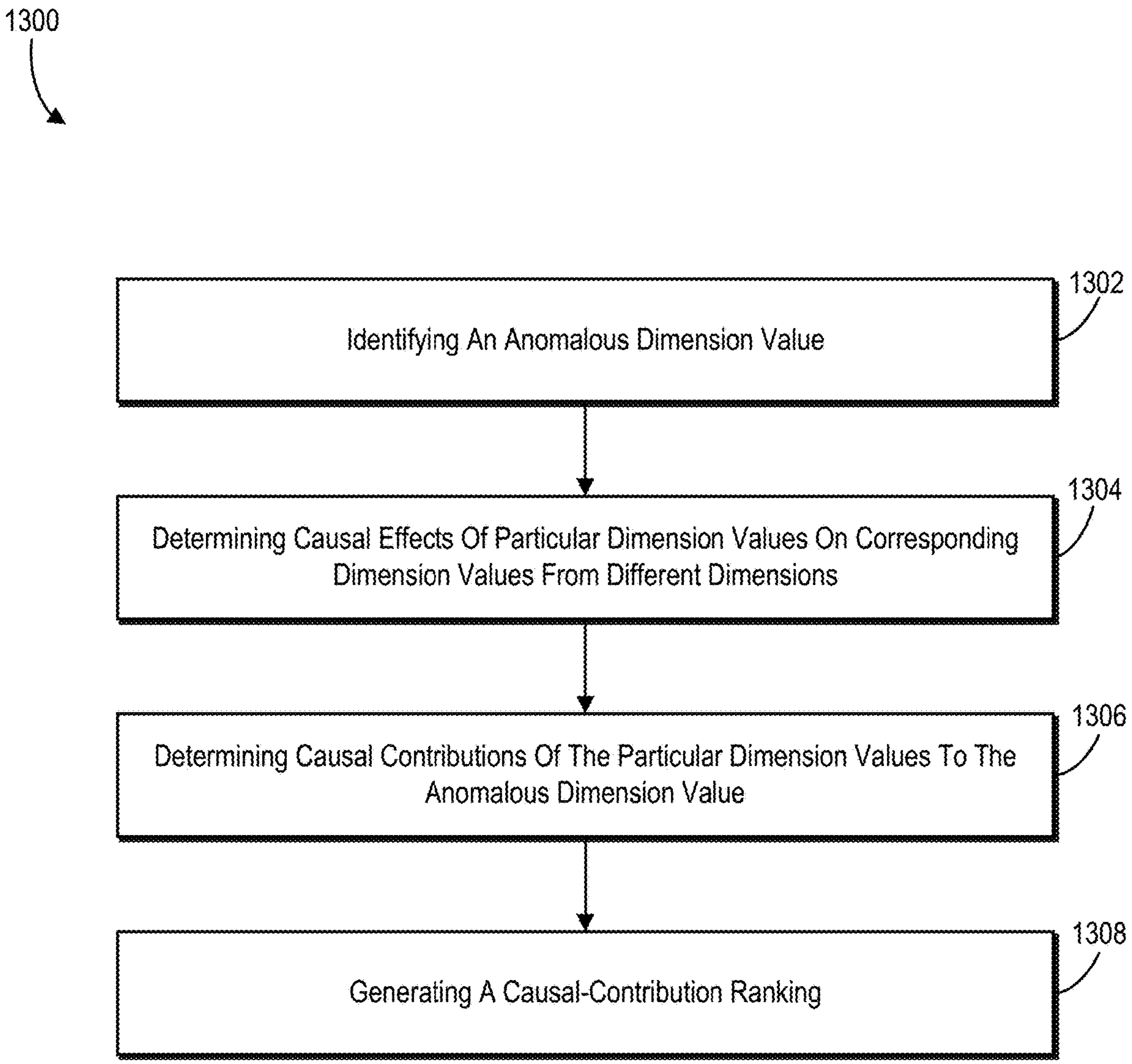
FIG. 13 illustrates a flowchart of a series of acts for ranking the causal contributions of particular dimension values to an anomalous dimension value in accordance with one or more embodiments.

FIGS. 1-12, the corresponding text and the examples provide a number of different methods, systems, devices, and non-transitory computer-readable media of the causal contribution system 106. In addition to the foregoing, one or more embodiments can also be described in terms of flowcharts comprising acts for accomplishing the particular result, as shown in FIG. 13. FIG. 13 may be performed with more or fewer acts. Further, the acts may be performed in different orders. Additionally, the acts described herein may be repeated or performed in parallel with one another or in parallel with different instances of the same or similar acts.

As mentioned, FIG. 13 illustrates a flowchart of a series of acts 1300 for ranking the causal contributions of particular dimension values to an anomalous dimension value in accordance with one or more embodiments. While FIG. 13 illustrates acts according to one embodiment, alternative embodiments may omit, add to, reorder, and/or modify any of the acts shown in FIG. 13. The acts of FIG. 13 can be performed as part of a method. For example, in some embodiments, the acts of FIG. 13 can be performed, in a digital medium environment for contribution analysis of anomalous data with causal correction, as part of a computer-implemented method. Alternatively, a non-transitory computer-readable medium can store instructions thereon that, when executed by at least one processor, cause a computing device to perform the acts of FIG. 13. In some embodiments, a system can perform the acts of FIG. 13. For example, in one or more embodiments, a system includes at least one memory device comprising an anomalous dataset across a plurality of dimensions for an anomalous time period and a reference dataset across the plurality of dimensions for a reference time period. The system can further include at least one server device configured to cause the system to perform the acts of FIG. 13.

The series of acts 1300 includes an act 1302 of identifying an anomalous dimension value. For example, the act 1302 can involve identifying, within an anomalous dataset for an anomalous time period, an anomalous dimension value reflecting a threshold change in value between the anomalous time period and a reference time period.

The series of acts 1300 also includes an act 1304 of determining causal effects of particular dimension values on corresponding dimension values from different dimensions. For example, the act 1304 can involve determining causal effects of particular dimension values on corresponding dimension values from different dimensions within a reference dataset for the reference time period by traversing a causal network generated on the reference dataset. In one or more embodiments, the causal contribution system 106 determines the causal effects of the particular dimension values on the corresponding dimension values by determining, from the causal network, interventional marginal probabilities that the particular dimension values effect the corresponding dimension values.

In one or more embodiments, the causal contribution system 106 determines a causal effect of a particular dimension value on a corresponding dimension value by: removing, within the causal network, one or more edges between a node corresponding to a dimension of the particular dimension value and one or more nodes corresponding to one or more dimensions determined to be a causal parent of the dimension; setting the node corresponding to the dimension as equal to the particular dimension value; and determining the causal effect of the particular dimension value on the corresponding dimension value based on performing an inference algorithm on a portion of the causal network in which the node equals the particular dimension value.

In one or more embodiments, the causal contribution system 106 further determines marginal probabilities of the particular dimension values occurring within the reference dataset based on traversing the causal network. Indeed, the causal contribution system 106 can traverse a causal network generated on the reference dataset for the reference time period to: determine marginal probabilities of particular dimension values occurring within the reference dataset; and determine causal effects of the particular dimension values on corresponding dimension values from different dimensions from the plurality of dimensions. For example, in some embodiments, the causal contribution system 106 determines the marginal probabilities of the particular dimension values occurring within the reference dataset by: identifying a number of occurrences of each dimension value from the particular dimension values within the reference dataset; and comparing the number of occurrences of each dimension value to a number of events within the reference dataset.

In some embodiments, the causal contribution system 106 further determines anomalous marginal probabilities of the particular dimension values occurring within the anomalous dataset. In particular, the causal contribution system 106 can determine anomalous marginal probabilities of the particular dimension values occurring within the anomalous dataset based on a number of events within the anomalous dataset associated with each dimension value. For example, in one or more embodiments, the causal contribution system 106 determines anomalous marginal probabilities of the particular dimension values occurring within the anomalous dataset by: identifying a number of occurrences of each dimension value from the particular dimension values within the anomalous dataset; and comparing the number of occurrences of each dimension value to a number of events within the anomalous dataset.

The series of acts 1300 further includes an act 1306 of determining causal contributions of the particular dimension values to the anomalous dimension value. For example, the act 1306 can involve determining causal contributions of the particular dimension values to the anomalous dimension value based on the causal effects of the particular dimension values on the corresponding dimension values. In one or more embodiments, the causal contribution system 106 determines the causal contributions of the particular dimension values to the anomalous dimension value by determining interventional probabilities of the particular dimension values contributing to the anomalous dimension value.

In one or more embodiments, the causal contribution system 106 further determines the causal contributions of the particular dimension values to the anomalous dimension value based on the marginal probabilities of the particular dimension values occurring within the reference dataset. Indeed, the causal contribution system 106 can determine causal contributions of the particular dimension values to the anomalous dimension value based on the marginal probabilities of the particular dimension values occurring within the reference dataset and the causal effects of the particular dimension values.

In some embodiments, the causal contribution system 106 also determines the causal contributions of the particular dimension values to the anomalous dimension value based on the anomalous marginal probabilities of the particular dimension values. For example, in one or more embodiments, the causal contribution system 106 determines the causal contributions of the particular dimension values to the anomalous dimension value utilizing a causal mixture model that models the anomalous marginal probabilities of the particular dimension values as a function of the marginal probabilities of the particular dimension values, the causal effects of the particular dimension values (e.g., interventional marginal probabilities corresponding to the particular dimension values), and the causal contributions of the particular dimension values (e.g., interventional probabilities of the particular dimension values contributing to the anomalous dimension value). In some instances, the causal contributions of the particular dimension values to the anomalous dimension value comprise values indicating weighted contributions of the causal effects of the particular dimension values to the anomalous marginal probabilities within the causal mixture model.

In one or more embodiments, the causal contribution system 106 further utilizes an optimization model to reduce the error in determining the causal contributions of the particular dimension values. For example, the causal contribution system 106 can determine the causal contributions of the particular dimension values to the anomalous dimension value utilizing an optimization model to minimize, for a selected dimension, a difference between expected dimension values occurring within the anomalous dataset according to the anomalous marginal probabilities and observed dimension values occurring within the anomalous dataset. In some instances, the causal contribution system 106 determines the causal contributions of the particular dimension values to the anomalous dimension value utilizing the optimization model by: combining, for each dimension associated with the particular dimension values, a plurality of differences between particular expected dimension values occurring within the anomalous dataset according to the anomalous marginal probabilities and particular observed dimension values occurring within the anomalous dataset; identifying a dimension associated with a maximum combined difference; and determining a causal contribution of a particular dimension value based on minimizing the maximum combined difference utilizing the optimization model.

To illustrate, in some embodiments, the causal contribution system 106 determines the causal contributions of the particular dimension values to the anomalous dimension value by utilizing an optimization model to: determine, for each dimension from the plurality of dimensions, expected dimension values occurring within the anomalous dataset according to the marginal probabilities of the particular dimension values and the casual effects of the particular dimension values on the corresponding dimension values from the different dimensions; determine, for each dimension from the plurality of dimensions, observed dimension values occurring within the anomalous dataset; and minimize, for each dimension from the plurality of dimensions, a difference between the expected dimension values and the observed dimension values. In one more embodiments, the causal contribution system 106 minimizes, for each dimension from the plurality of dimensions, the difference between the expected dimension values and the observed dimension values by: identifying a dimension from the plurality of dimensions associated with a maximum difference between particular expected dimension values occurring within the anomalous dataset and particular observed dimension values occurring within the anomalous dataset; and minimize the maximum difference between the particular expected dimension values and the particular observed dimension values for each dimension utilizing an objective function.

Additionally, the series of acts 1300 includes an act 1308 of generating a causal-contribution ranking. For example, the act 1308 can involve generating a causal-contribution ranking of the particular dimension values contributing to the anomalous dimension value based on the causal contributions of the particular dimension values. In terms of a distribution of causal contributions of particular dimension values to the anomalous dimension value, the act 1308 can involve generating a causal-contribution ranking of the particular dimension values contributing to the anomalous dimension value based on the distribution of causal contributions of the particular dimension values.

In one or more embodiments, the series of acts 1300 further includes acts for utilizing a graphical user interface on a client device for receiving user interactions and displaying information related to dimension values represented in a dataset. For example, in one or more embodiments, the acts include receiving, from a client device, an indication of a user selection of the anomalous time period; and providing, for display on a graphical user interface of the client device, a graphical visualization of selected dimension values contributing to the anomalous dimension value according to the causal-contribution ranking. In some embodiments, the acts include receive a user selection of a dimension value associated with a dimension via a graphical user interface of a client device; and based on the user selection, provide, for display on the graphical user interface of the client device: marginal probabilities corresponding to contributions of the dimension value to dimension values of other dimensions before an intervention within the causal network; and interventional marginal probabilities corresponding to contributions of the dimension value to the dimension values after the intervention within the causal network.

In one or more embodiments, the acts include identifying, for display on a graphical user interface of a client device, a dimension value as contributing to the anomalous dimension value based on the causal-contribution ranking of the particular dimension values. In some instances, the acts include identifying a subset of dimension values from the particular dimension values corresponding to highest contributions to the anomalous dimension value based on the causal-contribution ranking of the particular dimension values and a threshold contribution for dimension values; and providing, for display on a graphical user interface of a client device, the subset of dimension values.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
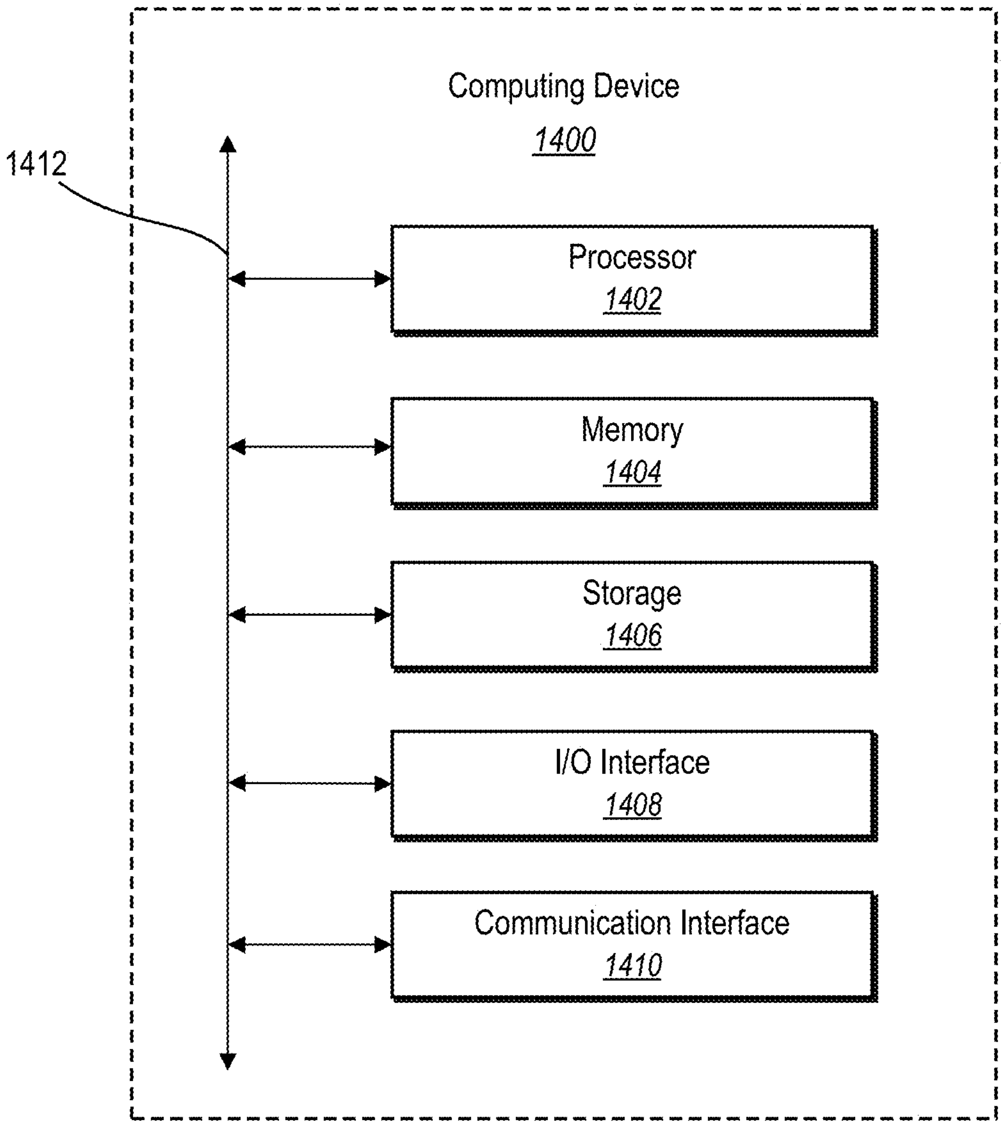
FIG. 14 illustrates a block diagram of an exemplary computing device in accordance with one or more embodiments.

FIG. 14 illustrates a block diagram of an example computing device 1400 that may be configured to perform one or more of the processes described above. One will appreciate that one or more computing devices, such as the computing device 1400 may represent the computing devices described above (e.g., the server(s) 102, the administrator device 110, and/or the client devices 114*a*-114*n*). In one or more embodiments, the computing device 1400 may be a mobile device (e.g., a mobile telephone, a smartphone, a PDA, a tablet, a laptop, a camera, a tracker, a watch, a wearable device). In some embodiments, the computing device 1400 may be a non-mobile device (e.g., a desktop computer or another type of client device). Further, the computing device 1400 may be a server device that includes cloud-based processing and storage capabilities.

As shown in FIG. 14, the computing device 1400 can include one or more processor(s) 1402, memory 1404, a storage device 1406, input/output interfaces 1408 (or "I/O interfaces 1408"), and a communication interface 1410, which may be communicatively coupled by way of a communication infrastructure (e.g., bus 1412). While the computing device 1400 is shown in FIG. 14, the components illustrated in FIG. 14 are not intended to be limiting. Additional or alternative components may be used in other embodiments. Furthermore, in certain embodiments, the computing device 1400 includes fewer components than those shown in FIG. 14. Components of the computing device 1400 shown in FIG. 14 will now be described in additional detail.

In particular embodiments, the processor(s) 1402 includes hardware for executing instructions, such as those making up a computer program. As an example, and not by way of limitation, to execute instructions, the processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 including storage for storing data or instructions. As an example, and not by way of limitation, the storage device 1406 can include a non-transitory storage medium described above. The storage device 1406 may include a hard disk drive (HDD), flash memory, a Universal Serial Bus (USB) drive or a combination these or other storage devices.

As shown, the computing device 1400 includes one or more I/O interfaces 1408, which are provided to allow a user to provide input to (such as user strokes), receive output from, and otherwise transfer data to and from the computing device 1400. These I/O interfaces 1408 may include a mouse, keypad or a keyboard, a touch screen, camera, optical scanner, network interface, modem, other known I/O devices or a combination of such I/O interfaces 1408. The touch screen may be activated with a stylus or a finger.

The I/O interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1408 are configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 provides one or more interfaces for communication (such as, for example, packet-based communication) between the computing device and one or more other computing devices or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can include hardware, software, or both that connects components of computing device 1400 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:

receiving, from a client device, user input defining an anomalous time period in an anomalous dataset for generating a causal-contribution ranking, the anomalous dataset having an anomalous representation of a dimension value during the anomalous time period compared to a representation of a corresponding dimension value within a reference time period;

generating, from a reference dataset having a representation of dimension values from the reference time period, a causal network representing dependencies between different dimensions associated with the dimension values;

determining a probability that an additional dimension value of the dimension values contributed to the anomalous representation of the dimension value within the anomalous time period;

determining causal contributions of one or more additional dimension values to a contribution of the additional dimension value to the anomalous representation of the dimension value by traversing the causal network and determining, from the causal network, causal effects of one or more additional dimension values on the dimension value; and adjusting the probability that the additional dimension value contributed to the anomalous representation of the dimension value based on the causal contributions of the one or more additional dimension values to the contribution of the additional dimension value to the anomalous representation of the dimension value.

2. The computer-implemented method of claim 1, further comprising:

determining marginal probabilities of the dimension values occurring within a reference dataset based on traversing the causal network; and determining the causal contributions of the one or more additional dimension values to the dimension value based on the marginal probabilities of the dimension values occurring within the reference dataset.

3. The computer-implemented method of claim 2, further comprising:

determining anomalous marginal probabilities of the one or more additional dimension values by:

identifying a number of occurrences of each dimension value from the one or more additional dimension values within the anomalous dataset;

comparing the number of occurrences of each dimension value to a number of events within the anomalous dataset; and determining the causal contributions of the one or more additional dimension values to the dimension value based on the anomalous marginal probabilities of the one or more additional dimension values.

4. The computer-implemented method of claim 3, wherein determining the causal contributions of one or more additional dimension values to the contribution of the dimension value comprises utilizing a causal mixture model that models the anomalous marginal probabilities of the one or more additional dimension values as a function of the marginal probabilities of the dimension values and the causal contributions of the one or more additional dimension values.

5. The computer-implemented method of claim 4, wherein the causal contributions of the one or more additional dimension values comprise values indicating weighted contributions of causal effects of one or more additional dimension values to the anomalous marginal probabilities within the causal mixture model.

6. The computer-implemented method of claim 5, wherein determining the causal contributions of one or more additional dimension values to the contribution of the dimension value comprises utilizing an optimization model to minimize, for a selected dimension, a difference between expected dimension values occurring within the anomalous dataset according to the anomalous marginal probabilities and observed dimension values occurring within the anomalous dataset.

7. The computer-implemented method of claim 6, further comprising:

combining, for each dimension associated with the one or more additional dimension values, a plurality of differences between particular expected dimension values occurring within the anomalous dataset according to the anomalous marginal probabilities and particular observed dimension values occurring within the anomalous dataset;

identifying a dimension associated with a maximum combined difference; and determining a causal contribution of a given dimension value based on minimizing the maximum combined difference utilizing the optimization model.

8. The computer-implemented method of claim 1, wherein determining causal contributions of one or more additional dimension values to a contribution of the dimension value to the anomalous representation of the dimension value comprises:

removing, within the causal network, one or more edges between a node corresponding to a dimension of the dimension value and one or more nodes corresponding to one or more dimensions determined to be a causal parent of the dimension;

setting the node corresponding to the dimension as equal to the dimension value; and determining a causal effect of the dimension value on the corresponding dimension value based on performing an inference algorithm on a portion of the causal network in which the node equals the dimension value.

9. A non-transitory computer-readable medium storing instructions thereon that, when executed by at least one processor, cause the at least one processor to perform operations comprising:

receiving, from a client device, user input defining an anomalous time period in an anomalous dataset for generating a causal-contribution ranking, the anomalous dataset having an anomalous representation of a dimension value during the anomalous time period compared to a representation of a corresponding dimension value within a reference time period;

generating, from a reference dataset having a representation of dimension values from the reference time period, a causal network representing dependencies between different dimensions associated with the dimension values;

determining a probability that an additional dimension value of the dimension values contributed to the anomalous representation of the dimension value within the anomalous time period;

determining causal contributions of one or more additional dimension values to a contribution of the additional dimension value to the anomalous representation of the dimension value by traversing the causal network and determining, from the causal network, causal effects of one or more additional dimension values on the dimension value; and adjusting the probability that the additional dimension value contributed to the anomalous representation of the dimension value based on the causal contributions of the one or more additional dimension values to the contribution of the additional dimension value to the anomalous representation of the dimension value.

10. The non-transitory computer-readable medium of claim 9, further comprising additional instructions that, when executed by the at least one processor, cause the at least one processor to perform further operations comprising:

determining marginal probabilities of the dimension values occurring within a reference dataset based on traversing the causal network; and determining the causal contributions of the one or more additional dimension values to the dimension value based on the marginal probabilities of the dimension values occurring within the reference dataset.

11. The non-transitory computer-readable medium of claim 10, further comprising additional instructions that, when executed by the at least one processor, cause the at least one processor to perform further operations comprising:

determining anomalous marginal probabilities of the one or more additional dimension values by:

identifying a number of occurrences of each dimension value from the one or more additional dimension values within the anomalous dataset;

comparing the number of occurrences of each dimension value to a number of events within the anomalous dataset; and determining the causal contributions of the one or more additional dimension values to the dimension value based on the anomalous marginal probabilities of the one or more additional dimension values.

12. The non-transitory computer-readable medium of claim 11, wherein determining the causal contributions of one or more additional dimension values to the contribution of the dimension value comprises utilizing a causal mixture model that models the anomalous marginal probabilities of the one or more additional dimension values as a function of the marginal probabilities of the dimension values and the causal contributions of the one or more additional dimension values.

13. The non-transitory computer-readable medium of claim 12, wherein the causal contributions of the one or more additional dimension values comprise values indicating weighted contributions of causal effects of one or more additional dimension values to the anomalous marginal probabilities within the causal mixture model.

14. The non-transitory computer-readable medium of claim 13, wherein determining the causal contributions of one or more additional dimension values to the contribution of the dimension value comprises utilizing an optimization model to minimize, for a selected dimension, a difference between expected dimension values occurring within the anomalous dataset according to the anomalous marginal probabilities and observed dimension values occurring within the anomalous dataset.

15. The non-transitory computer-readable medium of claim 14, further comprising additional instructions that, when executed by the at least one processor, cause the at least one processor to perform further operations comprising:

combining, for each dimension associated with the one or more additional dimension values, a plurality of differences between particular expected dimension values occurring within the anomalous dataset according to the anomalous marginal probabilities and particular observed dimension values occurring within the anomalous dataset;

identifying a dimension associated with a maximum combined difference; and determining a causal contribution of a given dimension value based on minimizing the maximum combined difference utilizing the optimization model.

16. The non-transitory computer-readable medium of claim 9, wherein determining causal contributions of one or more additional dimension values to a contribution of the dimension value to the anomalous representation of the dimension value comprises:

removing, within the causal network, one or more edges between a node corresponding to a dimension of the dimension value and one or more nodes corresponding to one or more dimensions determined to be a causal parent of the dimension;

setting the node corresponding to the dimension as equal to the dimension value; and determining a causal effect of the dimension value on the corresponding dimension value based on performing an inference algorithm on a portion of the causal network in which the node equals the dimension value.

17. A system comprising:

at least one memory device; and at least one server device operably coupled to the at least one memory device, the at least one server device configured to cause the system to:

receive, from a client device, user input defining an anomalous time period in an anomalous dataset for generating a causal-contribution ranking, the anomalous dataset having an anomalous representation of a dimension value during the anomalous time period compared to a representation of a corresponding dimension value within a reference time period;

determine a probability that an additional dimension value contributed to the anomalous representation of the dimension value within the anomalous time period;

determine causal contributions of one or more additional dimension values to a contribution of the additional dimension value to the anomalous representation of the dimension value by traversing a causal network representing dependencies between different dimensions associated with dimension values; and adjust the probability that the additional dimension value contributed to the anomalous representation of the dimension value based on the causal contributions of the one or more additional dimension values to the contribution of the additional dimension value to the anomalous representation of the dimension value.

18. The system of claim 17, wherein the at least one server device is further configured to cause the system to generate a causal-contribution ranking based on the adjusted probability that the dimension value contributed to the anomalous representation of the dimension value and adjusted probabilities of other dimension values.

19. The system of claim 18, wherein the at least one server device is further configured to cause the system to identify, for display on a graphical user interface of the client device, one or more anomalous dimension values as contributing to the anomalous representation of the dimension value based on the causal-contribution ranking.

20. The system of claim 18, wherein the at least one server device is further configured to cause the system to provide, for display on a graphical user interface of the client device, a graphical visualization of selected dimension values contributing to the anomalous representation of the dimension value according to the causal-contribution ranking.

* * * * *